United States Patent
Ooi et al.

(10) Patent No.: US 7,688,700 B2
(45) Date of Patent: Mar. 30, 2010

(54) PHASE CORRECTION ELEMENT AND OPTICAL HEAD DEVICE

(75) Inventors: Yoshiharu Ooi, Koriyama (JP); Masahiro Murakawa, Yokohama (JP); Hiromasa Sato, Koriyama (JP); Masao Miyamura, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 1248 days.

(21) Appl. No.: 11/045,088

(22) Filed: Jan. 31, 2005

(65) Prior Publication Data

US 2005/0226122 A1  Oct. 13, 2005
US 2010/0020671 A9  Jan. 28, 2010

Related U.S. Application Data

(63) Continuation of application No. PCT/JP03/09746, filed on Jul. 31, 2006.

(30) Foreign Application Priority Data

Jul. 31, 2002 (JP) ............... 2002-223085
Aug. 28, 2002 (JP) ............... 2002-248835
Aug. 29, 2002 (JP) ............... 2002-251911
Oct. 9, 2002 (JP) ............... 2002-295731
Dec. 24, 2002 (JP) ............... 2002-372435

(51) Int. Cl.
*G11B 7/00* (2006.01)
(52) U.S. Cl. ............... 369/112.05; 369/44.23; 369/112.02; 369/112.01
(58) Field of Classification Search ............ 369/112.02
See application file for complete search history.

(56) References Cited

U.S. PATENT DOCUMENTS

| | | |
|---|---|---|
| 7,388,822 B2 | 6/2008 | Ooi et al. |
| 2007/0109489 A1 | 5/2007 | Nomura et al. |
| 2007/0127348 A1 | 6/2007 | Ooi et al. |
| 2007/0146625 A1 | 6/2007 | Ooi et al. |
| 2007/0182915 A1 | 8/2007 | Osawa et al. |
| 2007/0183293 A1 | 8/2007 | Murata et al. |

FOREIGN PATENT DOCUMENTS

| | | |
|---|---|---|
| JP | 7-98431 | 4/1995 |
| JP | 2713257 | 10/1997 |

(Continued)

*Primary Examiner*—Jorge L Ortiz Criado
(74) *Attorney, Agent, or Firm*—Oblon, Spivak, McClelland, Maier & Neustadt, L.L.P.

(57) ABSTRACT

A phase correction element comprising a first phase correction layer formed in a region of numerical aperture $NA_2$, and a first phase plate; the first phase correction layer comprising a concavo-convex portion having a rotational symmetry with respect to the optical axis of incident light and having a cross-sectional shape of a saw-tooth-form or a saw-tooth-form whose convex portions are each approximated by a step form; the first phase plate generating a birefringent phase difference of about an odd number times of $\pi/2$ for linearly polarized light of $\lambda_1$; and the phase correction element that does change a transmitted wavefront of $\lambda_1$ and changing a transmitted wavefront of the $\lambda_2$ or transmitted wavefront of both wavelengths of $\lambda_2$ and $\lambda_3$ when three types of incident light at $\lambda_1$=410 nm, $\lambda_2$=650 nm and $\lambda_3$=780 nm respectively, are incident.

11 Claims, 10 Drawing Sheets

FOREIGN PATENT DOCUMENTS

| | | |
|---|---|---|
| JP | 2725653 | 12/1997 |
| JP | 2001-209966 | 8/2001 |
| JP | 2002-174711 | 6/2002 |
| JP | 2003149443 A * | 5/2003 |
| JP | 2003-207714 | 7/2003 |
| JP | 2003-281775 | 10/2003 |
| JP | 2003-288733 | 10/2003 |

* cited by examiner

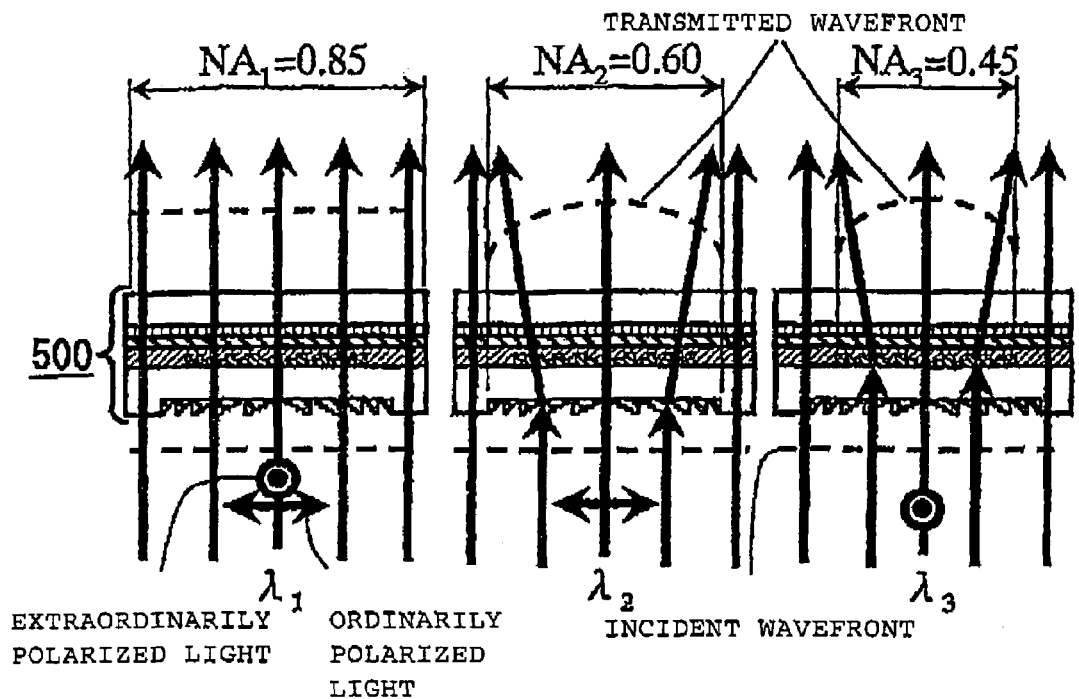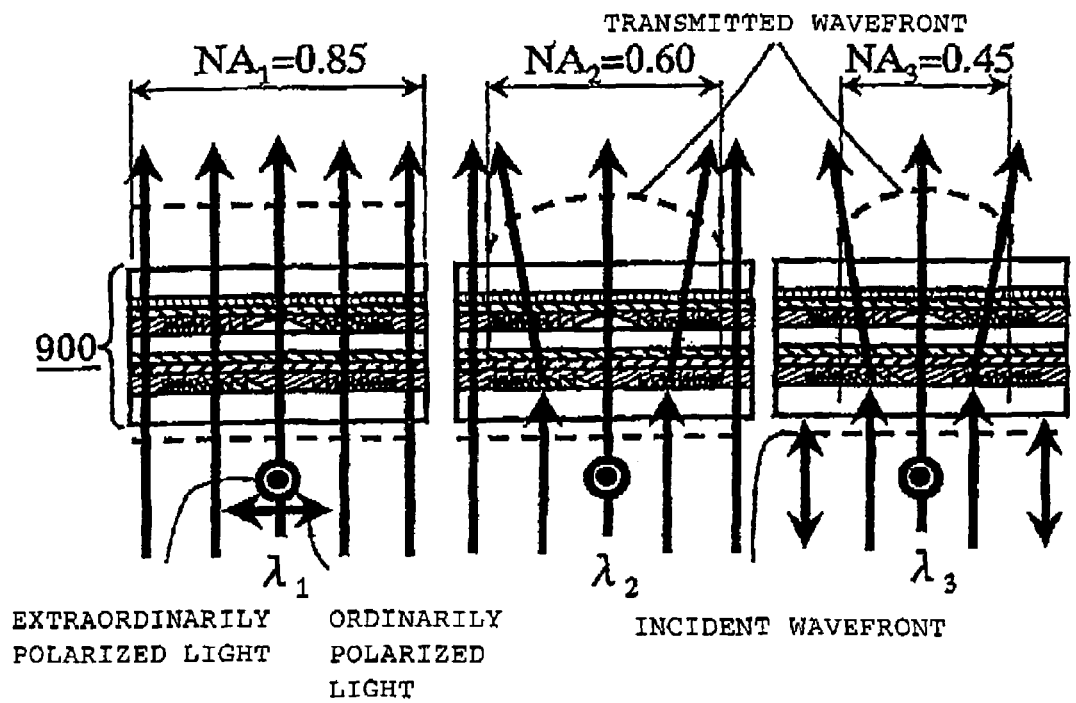

US 7,688,700 B2

PHASE CORRECTION ELEMENT AND OPTICAL HEAD DEVICE

CROSS REFERENCE TO RELATED APPLICATIONS

This application is a continuation of Application PCT/JP03/09746, filed Jul. 31, 2003, which claims priority to JP 2002-223085, filed Jul. 31, 2002; JP 2002-248835, filed Aug. 28, 2002; JP 2002-251911, filed Aug. 29, 2002; JP 2002-295731, filed Oct. 9, 2002; and JP 2002-372435, filed Dec. 24, 2002.

TECHNICAL FIELD

The present invention relates to a phase correction element and an optical head device, particularly to a phase correction element to be employed for an optical head device to be used for recording and/or reproducing an information from three types of optical recording media employing different wavelengths, and to the optical head device.

BACKGROUND ART

Recently, as well known, various types of optical recording media for recording and/or reproducing information and optical head devices capable of recording and/or reproducing an information to the optical recording media have been developed and used.

Among these, an optical recording medium (hereinafter referred to as "optical disk") for CD is an optical disk having a cover thickness of 1.2 mm for protecting the information recording plane, and a semiconductor laser of a 780 nm wavelength band as a light source and an objective lens having an NA (numerical aperture) of from 0.44 to 0.51 are employed for recording and/or reproducing an information.

On the other hand, an optical disk for DVD is an optical disk having a cover thickness of 0.6 mm, and a semiconductor laser of 650 nm wavelength band as a light source and an objective lens having a NA of from 0.60 to 0.65 are employed for recording and/or reproducing an information.

Further, in order to increase recordable information volume, an optical disk having a cover thickness of 0.1 mm for which a semiconductor laser of 410 nm wavelength band as a light source and an objective lens having a NA of 0.85 are employed, is proposed. Hereinafter, an optical disk for which a semiconductor laser of 410 nm wavelength band is employed is specifically referred to as an optical disk for HD.

Here, light in a $\lambda_1=410$ nm wavelength band means light having wavelength from about 390 nm to about 430 nm, light in a $\lambda_2=650$ nm wavelength band means light having wavelength from about 630 nm to about 680 nm, and light in a $\lambda_3=780$ nm wavelength band means light having wavelength from about 760 nm to about 820 nm.

Further, numerical apertures NA of objective lenses to be employed for HD, DVD and CD are designated as $NA_1$, $NA_2$ and $NA_3$ respectively. $NA_1$ is about 0.85, $NA_2$ is about from 0.60 to 0.65, and $NA_3$ is about from 0.44 to 0.51.

Further, a phase difference caused by the difference between an ordinary refractive index and an extraordinary refractive index of a birefringent material for an ordinarily polarized light and an extraordinarily polarized light respectively, is referred to as "birefringent phase difference", the terms being used to distinguish from a normal phase difference corresponding to an optical path difference not caused by the dependency of refractive index on polarization. Further, "phase difference" is shown by a unit of radian (rad), and it is referred to as "wavelength phase difference" when it is described by a wavelength unit.

By the way, three types of optical disks for CD, for DVD and for HD have different cover thicknesses and wavelengths to be used from one another. Accordingly, there has been a problem that in an optical head device for recording and/or reproducing an information, when an objective lens designed for any one type of optical disk is mounted for recording and/or reproducing an information from these optical disks compatibly, for example, when the optical head device is used for recording and/or reproducing an information from a different type of optical disk from the above type of optical disk, a large spherical aberration is generated and recording and/or reproducing of the information can not be performed.

To cope with this problem, in order to perform recording and/or reproducing an information from optical disks having different cover thicknesses by employing a single objective lens in the optical head device, various solutions for reducing the spherical aberration generated have been proposed. (For example, JP-B-2713257 and JP-B-2725653.)

As a conventional example, JP-B-2713257 proposes an aperture-limiting element comprising a substrate and a multi-layer film filter which is a lamination of transparent dielectric films having different refractive indexes, or a diffraction grating formed in the periphery of the substrate. The aperture-limiting element switches NA by transmitting light having one wavelength and reflecting or diffracting light having the other wavelength.

FIG. 20 shows an example of a cross-sectional view of a conventional aperture-limiting element 1000 which transmits light having a wavelength of $\lambda_2$ for DVD and reflects light having a wavelength of $\lambda_3$ for CD. A multi-layer film filter 1200 is formed in an annular region (middle region) obtained by subtracting a circular region of numerical aperture $NA_3$ from a circular region of numerical aperture $NA_2$ on the surface of a transparent substrate (glass substrate) 1100, which constitutes an aperture-limiting element transmitting incident light having a wavelength of $\lambda_2$ and not transmitting incident light having a wavelength of $\lambda_3$.

Here, a phase compensation film 1300 for phase adjustment is formed on a multi-layer film filter 1200 having an annular region so as to align the phases of transmitted light having a wavelength of $\lambda_2$ between a circular region of numerical aperture $NA_3$ and the annular region in which the multi-layer film filter 1200 is formed.

Optical head device reducing spherical aberration caused by the difference of cover thickness of optical disks, can be constructed by employing the above aperture-limiting element 1000 together with an objective lens and by switching NA of light beam to be converged on an information recording plane depending on the difference of wavelengths for DVD and CD. Here, residual spherical aberration is reduced by making incident light having a wavelength of $\lambda_3$ into the objective lens, to be diverging light beam.

As a conventional example 2, JP-B-2725653 proposes a phase correction element comprising a hologram optical element with an aperture-limiting function having a concentric circular interference fringe pattern whose cross-sectional shape is a form of steps, in addition to the aperture-limiting element. The phase correction element transmits light having a first wavelength and diffracts light having a second wavelength different from the first wavelength to generate a spherical aberration canceling a spherical aberration of an objective lens.

Further, an optical head device for recording and/or reproducing an information in an optical recording medium of an optical disk such as a CD or a DVD, has a construction that light emitted from a semiconductor laser as a light source is converged on the optical recording medium by an objective lens, and returning light reflected by the optical recording medium is introduced into a photo-acceptance element as a photodetector by a beam splitter, and the information in the optical recording medium is transformed into an electrical signal.

Here, in order to effectively converge emitting light from the semiconductor laser on the optical recording medium of the optical disk and to effectively detect signal light from the optical recording medium by the photodetector, it is effective to employ a polarizing beam splitter. The polarizing beam splitter transmits in an incoming path linearly polarized light emitted from the light source and having a polarization plane in a predetermined direction, and reflects or diffracts in a returning path linearly polarized light reflected by the optical recording medium and thereby having a polarization plane perpendicular to that of the incoming path, whereby the polarizing beam splitter can switch the direction of light to the photodetector. Here, in order to change the polarization plane of the linearly polarized light in the returning path perpendicular to the polarization plane in the incoming path, a phase plate (¼ waveplate) generating a birefringent phase difference of $\pi/2$ for the wavelength of incident light, is employed, which is disposed in the optical path between the polarizing beam splitter and the optical recording medium.

However, as shown in the conventional examples 1 and 2, although there is an aperture-limiting element or a phase correction element applicable for recording and/or reproducing informations of two types of optical disks by employing a single objective lens, there is no phase correction element for three wavelengths applicable for recording and/or reproducing informations of three types of optical disks of HD, DVD and CD, it has been difficult to record and/or reproduce informations of these three types of optical disks by employing a single objective lens.

Further, when the aperture-limiting element of the above conventional example 1 is employed as a compatible element for three types of optical disks of HD, DVD and CD, it is necessary to add a function of wavelength selection filter which transmits incident light having a wavelength of $\lambda_1$ and does not transmits incident light having wavelengths of $\lambda_2$ and $\lambda_3$, in a first annular region obtained by subtracting a circular region of numerical aperture $NA_2$ for DVD from a circular region of numerical aperture $NA_1$ for HD (here, $NA_1 > NA_2$), of the aperture-limiting element 1000 shown in FIG. 20. Further, in the same manner, it is necessary to add a function of wavelength selection filter which transmits incident light having wavelengths of $\lambda_1$ and $\lambda_2$ and does not transmit incident light having a wavelength of $\lambda_3$, in a second annular region obtained by subtracting a circular region of numerical aperture $NA_3$ for CD from a circular region of numerical aperture $NA_2$ for DVD (here, $NA_2 > NA_3$). Further, it is necessary for the circular region of numerical aperture $NA_3$ to have a function of transmitting all of incident light having wavelengths of $\lambda_1$, $\lambda_2$ and $\lambda_3$.

Then, in a case of applying a conventional technique employing a multi-layer film filter for the wavelength selection filter, it is necessary to deposit multi-layer films having different spectral transmittances in the first annular region and the second annular region separately in the divided regions, which requires an extremely complicated process. Therefore, it has been difficult to stably produce an aperture-limiting element which does not deteriorate a transmitted wavefront aberration of incident light having a wavelength of $\lambda_1$ in the entire region of aperture $NA_1$. Here, a transmitted wavefront means a wavefront of light after the light is transmitted through an optical element such as a phase correction element. "A transmitted wavefront is changed" means that a wavefront of light is changed while the light is being transmitted through an optical element and the light is output with a changed wavefront.

Further, a phase correction element producing a birefringent phase difference of $\pi/2$ for a wavelength of $\lambda_1$ and having non-deteriorated property of phase correction element for wavelengths of $\lambda_2$ and $\lambda_3$ and with which a phase plate is integrally formed, has been demanded.

The present invention has been made to solve the above-mentioned problems, and it is an object of the present invention to provide a phase correction element and an optical head device applicable for recording and/or reproducing an information in three types of optical disks of HD, DVD and CD employing a single objective lens for HD.

DISCLOSURE OF THE INVENTION

A first aspect of the present invention provides a phase correction element for transmitting three kinds of light beams having three wavelengths $\lambda_1$, $\lambda_2$ and $\lambda_3$ ($\lambda_1 < \lambda_2 < \lambda_3$), which has an area of numerical aperture $NA_2$ and an area of numerical aperture $NA_1$ including the area of numerical aperture $NA_2$ ($NA_1 > NA_2$) in an element plane in which the light is incident, of the phase correction element; wherein in the area of numerical aperture $NA_2$, a first phase correction layer comprising a concavo-convex portion of a saw-tooth-form or an approximated saw-tooth-form having a cross-sectional shape of a saw-tooth-form or a saw-tooth-form, each of whose tooth is approximated by a step form, and having a rotational symmetry with respect to the optical axis of an incident light, is formed, and the first phase correction layer and a phase plate which transforms linearly polarized incident light having a wavelength of $\lambda_1$ into circularly polarized light by generating an odd number times of $\pi/2$ of birefringent phase difference, are integrally formed, whereby a transmitted wavefront of light having a wavelength of $\lambda_2$, or light having a wavelength of $\lambda_2$ and light having a wavelength of $\lambda_3$ incident in the region of numerical aperture $NA_2$ are changed while a transmitted wavefront of light having a wavelength of $\lambda_1$ incident in the region of numerical aperture $NA_1$ is maintained regardless of the polarization state.

Further, a second aspect of the present invention provides the phase correction element of the first aspect, wherein the first phase correction layer comprises a first transparent material and a second transparent material having different refractive index wavelength dispersions from each other, wherein the difference $\Delta n$ of their refractive indexes is 0 at the wavelength $\lambda_1$ and finite values at the wavelength $\lambda_2$ and the wavelength $\lambda_3$, the first transparent material comprises a saw-tooth-form concavo-convex portion having a cross-sectional shape of a saw-tooth-form or a saw-tooth-form each of whose tooth is approximated by a step form, and having a rotational symmetry with respect to the optical axis of an incident light, at least concave portions of the concavo-convex portion are filled with the second transparent material, and the height d of each of convex portions of the saw-tooth-form satisfies a formula $\lambda_2/2 \leq \Delta n \times d \leq \lambda_3$ provided that the difference of the refractive indexes at the wavelength $\lambda_2$ is $\Delta n$.

Further, a third aspect of the present invention provides the phase correction element of the first aspect, wherein each of convex portions of the saw-tooth-form of the first phase correction layer is approximated by a step form, and phase difference of a transmitted light having a wavelength of $\lambda_1$ between a convex portion and a concave portion of each step of the step form is a natural number times of $4\pi$.

Further, a fourth aspect of the present invention provides the phase correction element of any one of the first to the third aspect, wherein the first phase plate is constructed by laminating two phase plates having birefringent phase differences of $\pi$ and $\pi/2$ respectively at a middle wavelength $\lambda_c=(\lambda_1+\lambda_2)/2$ of $\lambda_1=410$ nm wavelength band and $\lambda_2=650$ nm wavelength band, so that the angle between their optical axes is $57\pm5°$, and the first phase plate produces a birefringent phase difference of an odd number times $\pi/2$ at least for linearly polarized incident light in the $\lambda_1$ and $\lambda_2$ wavelength bands to transform the linearly polarized incident light into circularly polarized light.

Further, a fifth aspect of the present invention provides the phase correction element of the third aspect, which further comprises a second phase correction layer in an area of aperture $NA_3$ ($NA_2>NA_3$) in the plane of the phase correction element, the second phase correction layer comprises a birefringent material layer having an ordinary refractive index $n_o$ and an extraordinary refractive index $n_e$ ($n_e \neq n_o$) in which the optical axis of a refractive index ellipsoid is uniformly in one direction, wherein the birefringent material layer comprises a saw-tooth-form concavo-convex portion having a saw-tooth-form cross-sectional shape each of whose convex portions is approximated by a step form, and having a rotational symmetry with respect to the optical axis of an incident light, at least concave portions of the concavo-convex portion are filled with a homogeneous refractive index transparent material having a refractive index of $n_s$ approximately equal to the ordinary refractive index $n_o$ or the extraordinary refractive index $n_e$, and the phase difference of extraordinarily polarized transmitted light or ordinarily polarized transmitted light having a wavelength of $\lambda_1$ corresponding to the step-height of each step of the step form, is an odd number times of $2\pi$.

Further, a sixth aspect of the present invention provides the phase correction element of the fifth aspect, wherein the first phase plate has a function of generating a birefringent phase difference of an odd number times of $\pi/2$ for linearly polarized incident light having a wavelength of $\lambda_1$ to convert it to circularly polarized light, and generating a birefringent phase differences of an odd number times of $\pi$ for linearly polarized light having a wavelength of $\lambda_2$ and linearly polarized light having a wavelength of $\lambda_3$ to rotate their polarization planes.

Further, a seventh aspect of the present invention provides the phase correction element of the sixth aspect, wherein the first phase plate has a construction that two phase plates having birefringent phase differences of $\pi/2$ and $\pi$ respectively for a wavelength $\lambda_1$, are laminated so that the angle between their optical axes is $45\pm5°$.

Further, an eighth aspect of the present invention provides the phase correction element of the first aspect, wherein the first phase correction layer comprises a first polarized phase correction layer and a second phase correction layer each comprising a birefringent material layer having ordinary refractive index of $n_o$ and an extraordinary refractive index $n_e$ ($n_o \neq n_e$), in which the optical axis of the refractive index ellipsoid is uniformly in one direction, the birefringent material layer has a saw-tooth-form concavo-convex portion having a cross-sectional shape of a saw-tooth-form or a shape in which each of convex portions of a saw-tooth-form is approximated by a step form, and having a rotational symmetry with respect to the optical axis of an incident light, and at least concave portions of the concave-concave portion are filled with a homogeneous refractive index transparent material having a refractive index of $n_s$ approximately equal to the ordinary refractive index $n_o$ or the extraordinary refractive index $n_e$, wherein the first phase plate has a function of generating a birefringent phase difference of an odd number times of $\pi/2$ for linearly polarized light in a $\lambda_1=410$ nm wavelength band to convert it to a circularly polarized light, and generating a birefringent phase difference of an odd number times of $\pi$ for linearly polarized light in a $\lambda_2=650$ nm wavelength band and linearly polarized light in a $\lambda_3=780$ nm wavelength band to rotate their polarization planes, the second phase plate has a function of generating a birefringent phase difference of an even number times of $\pi$ for linearly polarized incident light in a $\lambda_1=410$ nm wavelength band without changing the polarization state, and generating a birefringent phase difference of an odd number times of $\pi$ for linearly polarized incident light in a $\lambda_2=650$ nm wavelength band and linearly polarized incident light in a $\lambda_3=780$ nm wavelength band to rotate their polarization planes by $90°$, and the first phase plate, the first polarizing phase correction layer, the second phase plate and the second polarizing phase correction layer are arranged in this order and integrated.

Further, a ninth aspect of the present invention provides the phase correction element of any one of the first to eighth aspect, wherein a multi-layer film filter which transmits incident light in a $\lambda_1=410$ nm wavelength band and incident light in a $\lambda_2=650$ nm wavelength band and reflects incident light in a $\lambda_3=780$ nm wavelength band, or a diffraction grating which transmits incident light in a $\lambda_1=410$ nm wavelength band and incident light in a $\lambda_2=650$ nm wavelength band and reflects incident light in a $\lambda_3=780$ nm wavelength band and has a rectangular cross-sectional shape producing a phase difference of $10\pi$ for transmitted light in a $\lambda_1=410$ nm wavelength band between a convex portion and a concave portion, is formed in an annular shape region obtained by subtracting a circular region of a numerical aperture $NA_3$ from a circular region of a numerical aperture $NA_1$ ($NA_1>NA_2>NA_3$) in the phase correction element plane.

Further, a tenth aspect of the present invention provides the phase correction element of any one of the first to eighth aspect, wherein a diffraction grating which transmits incident light in a $\lambda_1=410$ nm wavelength band and diffracts incident light in a $\lambda_2=650$ nm wavelength band and incident light in a $\lambda_3=780$ nm wavelength band and has a cross-sectional shape of concavo-convex form producing a phase difference of $2\pi$ for transmitted light in a $\lambda_1=410$ nm wavelength band between a convex portion and a concave portion, is formed in a first annular region obtained by subtracting a circular region of a numerical aperture $NA_2$ from a circular region of numerical aperture $NA_1$ in the phase correction element plane, and a multi-layer film filter which transmits incident light in a $\lambda_1=410$ nm wavelength band and incident light in a $\lambda_2=650$ nm wavelength band and reflects incident light in a $\lambda_3=780$ nm wavelength band, or a diffraction grating which transmits incident light in a $\lambda_1=410$ nm wavelength band and incident light in a $\lambda_2=650$ nm wavelength band and diffracts incident light in a $\lambda_3=780$ nm wavelength band and has a rectangular cross-sectional shape producing a phase difference of $10\pi$ for transmitted light in a $\lambda_1=410$ nm wavelength band between a convex portion and a concave portion, is formed in a second annular region obtained by subtracting a circular region of numerical aperture $NA_3$ from a circular region of numerical aperture $NA_2$ in the phase correction element plane.

Further, an eleventh aspect of the present invention provides the phase correction element of the ninth or tenth aspect, wherein the phase difference for incident light having a wavelength of $\lambda_1$ is an integer times of $2\pi$ between the annular region of the ninth phase correction element in which the diffraction grating or the multi-layer film filter is formed or the first and the second annular regions of the tenth phase correction element, and the circular region of numerical aperture $NA_3$.

Further, the present invention provides an optical head device comprising light sources for emitting light having three wavelengths in a $\lambda_1$=410 nm wavelength band, a $\lambda_2$=650 nm wavelength band and a $\lambda_3$=780 nm wavelength band, an objective lens for converging the light having three wavelengths emitted in an optical recording medium, and photodetectors for detecting the light converge and reflected by the optical recording medium, wherein a phase correction element of any one of the first to eleventh aspect is disposed in an optical path from the light sources for emitting the light having three wavelengths to the optical recording medium.

BRIEF DESCRIPTION OF THE DRAWINGS

FIGS. 16(a) to 16(c) are cross-sectional views showing light beams and wavefronts when three types of light having different wavelengths are incident in the phase correction element according to the eighth embodiment, wherein FIG. 16(a) is in a case of light having a wavelength of $\lambda_1$, 16(b) is in a case of light having a wavelength of $\lambda_2$, and 16(c) is in a case of light having a wavelength of $\lambda_3$.

FIGS. 17(a) to 17(c) are cross-sectional views showing light beam and wavefronts when three types of light having different wavelengths are incident in the phase correction element according to the eighth embodiment, wherein FIG. 17(a) is in a case of light having a wavelength of $\lambda_1$, 17(b) is in a case of light having a wavelength of $\lambda_2$, and 17(c) is in a case of light having a wavelength of $\lambda_3$.

FIGS. 18(a) to 18(c) are cross-sectional views showing light beams and wavefronts when three types of light having different wavelengths are incident in the phase correction element according to the eighth embodiment, wherein FIG. 18(a) is in a case of light having a wavelength of $\lambda_1$, 18(b) is in a case of light having a wavelength of $\lambda_2$, and 18(c) is in a case of light having a wavelength of $\lambda_3$.

BEST MODE FOR CARRYING OUT THE INVENTION

Now, embodiments of the present invention will be described with reference to the drawings attached.

FIRST EMBODIMENT

Figure 1:
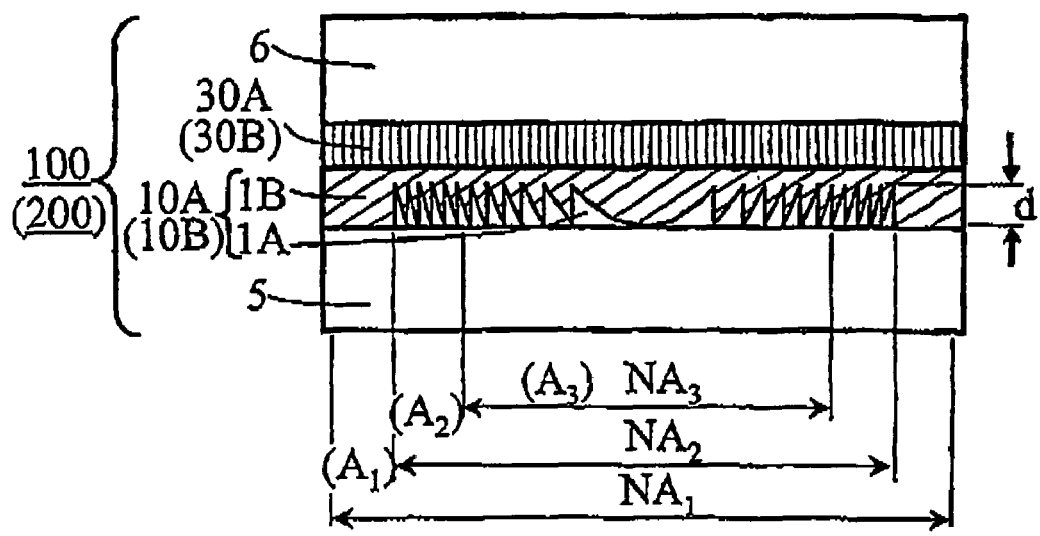
FIG. 1 is a cross-sectional view showing the construction of the phase correction element according to the first and the second embodiments of the present invention.
Figure 2:
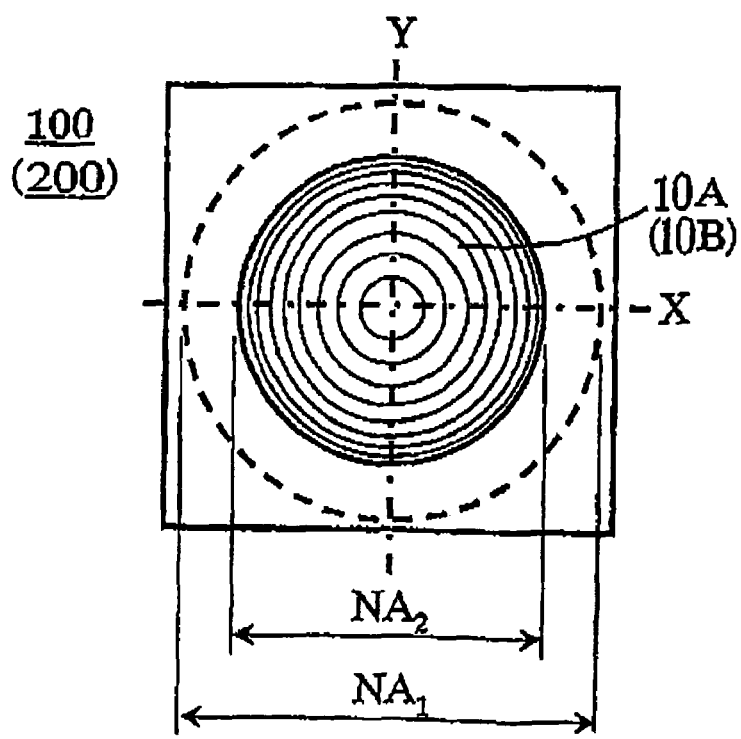
FIG. 2 is a plan view showing the construction of the phase correction element according to the first and the second embodiments of the present invention.

FIG. 1 is a cross-sectional view and FIG. 2 is a plan view showing an example of the construction of the first phase correction element according to the first embodiment of the present invention.

A first phase correction element 100 according to this embodiment is constructed by a first phase correction layer 10A and a first phase plate 30A each formed in a region of aperture $NA_2$.

The first phase correction layer 10A is formed in an area of aperture $NA_2$ corresponding to an optical disk for DVD in the effective diameter area of aperture $NA_1$ corresponding to an optical disk for HD in the phase correction element. The first phase correction layer 10A comprises a transparent material (first transparent material) 1A having a refractive index of $n_A$ formed to have a saw-tooth-like concavo-convex portion having a cross-sectional shape of a saw-tooth-form (so-called blazed diffraction grating type) or a saw-tooth-form each of whose convex portions is approximated by a step-like grating, and having a rotational symmetry with respect to the optical axis of incident light, and a transparent material (second transparent material) 1B of a refractive index of $n_B$ filling at least concave portions of the concavo-convex portion.

FIG. 1 shows an example of the construction that the first phase correction layer 10A is sandwiched between transparent substrates 5 and 6. However, the construction may be such that the first phase correction layer 10A is formed on the surface of the transparent substrate 5 and the concave portions of the first phase correction layer 10A are not filled with any material. The first phase correction layer 10A is a wavelength-selection type phase correction layer which does not change the transmitted wavefront of incident light having a wavelength of $\lambda_1$ into an area of aperture $NA_1$ in the phase correction layer plane, but changes the transmitted wavefront of light having a wavelength of $\lambda_2$ or a wavelength of $\lambda_2$ and a wavelength of $\lambda_3$, whereby the transmitted wavefront can be changed depending on the spatial shape distribution of the blazed diffraction grating.

The wavelength selection function of the phase correction layer is performed by using the difference between the transparent material 1A and the transparent material 1B in the dependency of refractive index on wavelength or in the dependency of refractive index on polarization, or by using the dependency of phase difference on wavelength on the step height of the step-like grating.

Further, in the first phase correction element 100, a first phase plate 30A in which the birefringent phase difference for light having a wavelength of $\lambda_1$ is an odd number times of $\pi/2$, is sandwiched between the transparent substrate 5 and the transparent substrate 6 to be integrally formed. The material of the first phase plate 30A may be any material so long as it has birefringency. For example, it may be an optical crystal such as a high-molecular liquid crystal or quartz, or polycarbonate which exhibits birefringency by a single-axis drawing. A high-molecular liquid crystal is preferred for the phase plate since it has relatively large birefringency and can be made uniformly and with large area as a thin film of at most 50 μm thick sandwiched between transparent substrates such as glass having a good flatness.

A linearly polarized light having a wavelength of $\lambda_1$ having a polarization plane at an angle of 45° to the optical axis of the first phase plate 30A is incident and shuttles through the first phase plate 30A to be transformed into a linearly polarized light whose polarization plane is perpendicular.

The first phase plate 30A may have a construction of a single layer of a birefringent material, a construction in which at least two layers are laminated or a construction that a high-polymer liquid crystal film is sandwiched between at least two transparent substrates. The dependency of birefringent phase difference on wavelength can be controlled by the birefringent material, or by controlling the dependency of birefringent phase difference on wavelength by laminating a phase plate.

For example, the first phase plate 30A may be made to be a phase plate functioning as a ¼ waveplate for incident light having three wavelengths of $\lambda_1$, $\lambda_2$ and $\lambda_3$, or a phase plate functioning as a ¼ waveplate for incident light having a wavelength of $\lambda_1$ and functioning as a ½ waveplate for incident light having wavelengths of $\lambda_2$ and $\lambda_3$.

Therefore, by employing the phase correction element of this embodiment, a wavefront aberration generated when an objective lens for HD is employed for a DVD or a CD, can be corrected. Further, by employing it as a phase correction element in an optical head device having a polarizing beam splitter (PBS) which transmits linearly polarized incident light having a wavelength of $\lambda_1$ and reflects or diffracts linearly polarized incident light having a polarization plane perpendicular to that of the above linearly polarized incident light, an optional system having high light-utilization efficiency can be realized and an optical head device for recording and/or reproducing with high reliability can be realized since the emission of a semiconductor laser light source is stabilized.

SECOND EMBODIMENT

Then, a second phase correction element 200 shown in FIG. 1, comprising a first phase correction layer 10B constituted by transparent materials having different refractive index wavelength dispersions, namely a first transparent material 1A and a second transparent material 1B, and having a refractive index wavelength dispersion that the refractive index difference $\Delta n$ is substantially zero at a wavelength of $\lambda_1$ and a definite value at wavelengths of $\lambda_2$ and $\lambda_3$, and the first phase plate 30B, will be described as follows. Here, the first phase plate 30B has the same construction as the first phase plate 30A of the first phase correction element 100.

The transparent material 1A and the transparent material 1B are two types of materials having considerably different refractive index wavelength dispersion in a visible wavelength region, which have the same refractive index at a wavelength of $\lambda_1$ and is transparent at wavelengths of $\lambda_1$, $\lambda_2$ and $\lambda_3$ and may absorb light at other wavelengths. The transparent material 1A and the transparent material 1B may be an inorganic material such as glass, or an organic material employed as a plastic lens or an optical resin. It may be a composite material of an inorganic material or an organic material in which fine particles are dispersed to adjust the refractive index wavelength dispersion.

Figure 3:
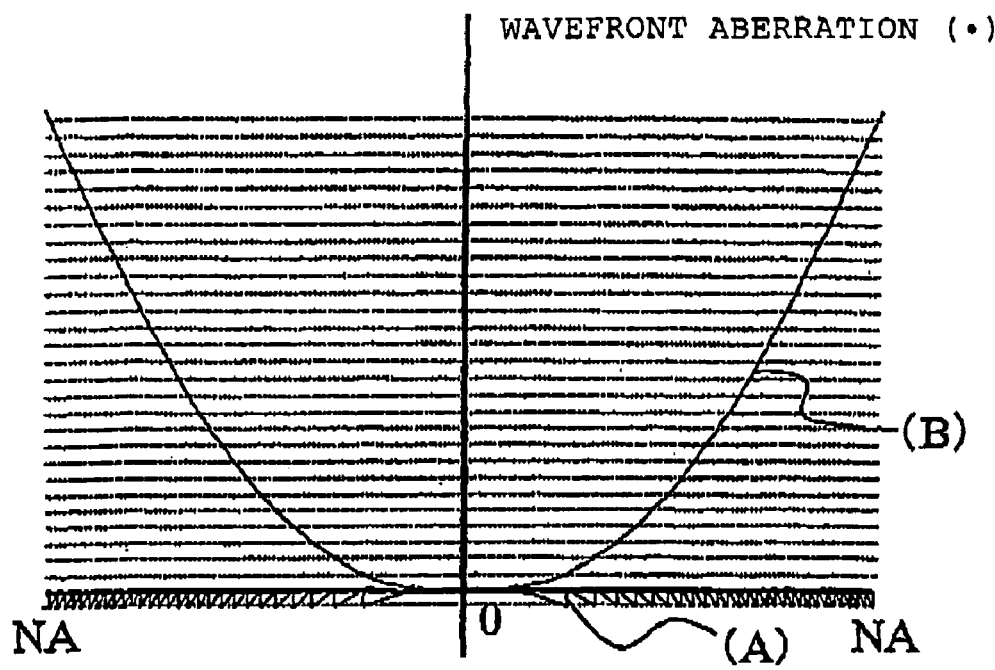
FIG. 3 is a graph showing a wavefront aberration of transmitted light at an optical disk for DVD or for CD, wherein (A) indicates a wavefront aberration generated by the phase correction element of the present invention and (B) indicates a wavefront aberration of transmitted light in an optical disk for DVD or for CD.

FIG. 3 is a graph showing the wavefront aberration of transmitted light at an optical disk for DVD or CD.

In FIG. 3, (A) indicates a wavefront aberration generated when the second phase correction element 200 of this embodiment is employed, and (B) indicates a wavefront aberration generated when the second phase correction element 200 is not employed.

(B) of FIG. 3 is a graph showing an example of a wavefront aberration generated when an objective lens for HD having a numerical aperture of $NA_1$ designed to have a preferred aberration for an optical disk for HD having a cover thickness of 0.1 mm in a wavelength region of $\lambda_1$=410 nm, is employed with an aperture of $NA_2$ for an optical disk for DVD having a cover thickness of 0.6 mm in a $\lambda_2$=650 nm wavelength region. This graph shows a wavefront aberration which is a spherical aberration with a power (magnification) component added. The horizontal axis shows a numerical aperture NA corresponding to the aperture diameter and the vertical axis shows the cross section of a wavelength phase difference which is an optical path difference of light beam at different NA values with respect to a ray on the optical axis (NA=0) by a unit of wavelength used. The wavefront aberration actually has a substantially three-dimensional shape symmetrical to an axis and has a substantially parabolic distribution.

In FIG. 3, a plurality of dotted lines in horizontal direction show equal-phase wavefronts of an integer times of a wavelength $\lambda_2$, and each of the intervals of the horizontal lines is the wavelength $\lambda_2$. They are each a wavelength phase difference obtained by subtracting an integer times of wavelength $\lambda_2$ from the wavefront aberration shown as (B) in FIG. 3, which is a wavefront aberration to be compensated by a wavefront aberration of at most $\lambda_2$. In FIG. 3, (A) shows a wavefront aberration generated when the first phase correction layer 10B of the second phase correction element 200 of the present invention is employed for compensating the wavefront aberration of at most $\lambda_2$, which has a concentric circular form in which the width of the bottom surface of a saw-tooth-form narrows from the center towards the periphery.

Further, the transparent material 1A processed to have a cross-sectional shape of a saw-tooth-form concavo-convex portion in the first phase correction layer 10B, has a Fresnel lens form having a saw-tooth-like cross-section shown in FIG. 1 and FIG. 2. The shape is determined as follows.

Namely, the orbicular zone radius of each convex portion of the transparent material 1A is determined from a plurality of orbicular zones obtained by slicing the wavefront aberration shown in FIG. 3(B) whose cross-sectional shape is substantially parabolic form and having a substantially paraboloid three-dimensional form, with an interval of wavelength $\lambda_2$ in a circular region of numerical aperture $NA_2$.

If these orbicular zones are arranged in a plane of zero wavefront aberration (a plane perpendicular to the paper in FIG. 3) in a concentric circular form around an axis of NA=0, the height of all of these orbicular zones become $\lambda_2$. Namely, the transparent material 1A is fabricated so that the optical path difference between the concave portion and the convex portion in the interface of the transparent material 1A and the transparent material 1B at a wavelength of $\lambda_2$, becomes $\lambda_2$.

When the refractive indexes satisfy $n_A > n_B$ at a wavelength $\lambda_2$, it is satisfactory that the transparent material 1A is processed to have a cross-sectional shape of saw-tooth-form corresponding to 1A of FIG. 1.

Further, when the refractive index $n_A < n_B$ at a wavelength of $\lambda_2$, the transparent material 1A is processed to have a cross-sectional shape corresponding to (A) of FIG. 3 which has a symmetry with respect to a plane perpendicular to the paper.

The height d of each of convex portions of the saw-tooth-form made of the transparent material 1A having a orbicular zone form corresponding to the wavefront aberration $\lambda_2$, is represented by $d=\lambda_2/\Delta n$ using a refractive index difference $\Delta n$ between the transparent material 1A and the transparent material 1B at the wavelength $\lambda_2$. When each convex portion of the saw-tooth-form is approximated by a step form, it is satisfactory that the height d is in a range satisfying a formula:

$$\lambda_2/2 \leq \Delta n \times d \leq \lambda_2$$

Further, in order to correct the aberration for a wavelength $\lambda_2$ and a wavelength of $\lambda_3$, it is satisfactory that the d is in a range represented by a formula:

$$\lambda_2/2 \leq \Delta n \times d \leq \lambda_3$$

Further, the height d is more preferably satisfy a formula:

$$\lambda_2 \leq \Delta n \times d \leq \lambda_3$$

Here, when a light having a wavelength $\lambda_1$ is incident into the second phase correction element 200, since the refractive index difference $\Delta n$ between the transparent material 1A and the transparent material 1B at the wavelength $\lambda_1$ is zero, the transmitted wavefront does not change. On the other hand, since the refractive index difference $\Delta n$ with respect to incident light having a wavelength of $\lambda_2$ is definite, a phase difference $\Delta n \times d/\lambda_2$ by a wavelength unit corresponding to the height d of the each convex portion of the saw-tooth-form, is generated, whereby a change of transmitted wavefront is formed as shown in (A) of FIG. 3, correcting the wavefront aberration shown in (B) of FIG. 3. Further, since the refractive index difference $\Delta n$ is definite also for incident light having a wavelength of $\lambda_3$, a phase difference $n \times d/\lambda_3$ by a wavelength unit corresponding to the height d of each convex portion of the saw-tooth-form is generated, and a change of transmitted wavefront similar to (A) of FIG. 3 is generated. Namely, it becomes a transmitted wavefront having a power corresponding to a concave lens.

Since the phase correction element functions as a concave lens for the wavelength $\lambda_2$ and the wavelength $\lambda_3$, the distance between an optical disk and an objective lens can be made larger, and the stability of an optical head device in recording and/or reproducing is improved.

Here, a wavefront aberration generated when the same objective lens for HD is employed in a $\lambda_3=780$ nm wavelength band with an aperture of $NA_3$ for an optical disk for CD having a cover thickness of 1.2 mm, is not completely corrected only by employing the second phase correction element 200. However, by making the incident light having a wavelength of $\lambda_3$ slightly divergent with respect to the phase correction element 200 and the object lens compared with the light having a wavelength of $\lambda_2$, good correction of wavefront aberration can be performed.

Further, the first phase correction layer 10B may be processed to have a shape correcting wavefront aberrations of a wavelength $\lambda_2$ and wavelength $\lambda_3$ generated when both of incident light having a wavelength of $\lambda_2$ and incident light having a wavelength of $\lambda_3$ slightly divergent light beam. In an optical head device comprising a dual-wavelength laser including semiconductor lasers emitting light having a wavelength of $\lambda_2$ and light having a wavelength of $\lambda_3$ integrated in a single package as a light source, and a common collimator lens for making the light of two wavelengths incident into an objective lens as the same level of divergent light beam, it is effective to employ a phase correction element 200 having such a property.

Therefore, by employing the second phase correction element 200, since the aberration can be corrected only by the difference of the wavelengths from the wavelength $\lambda_1$, regardless of the polarization conditions of the incident light having a wavelength of $\lambda_2$ and incident light having a wavelength of $\lambda_3$, there is little limitation of the first phase plate 30B to the wavelength $\lambda_2$ and the wavelength $\lambda_3$.

THIRD EMBODIMENT

Figure 4:
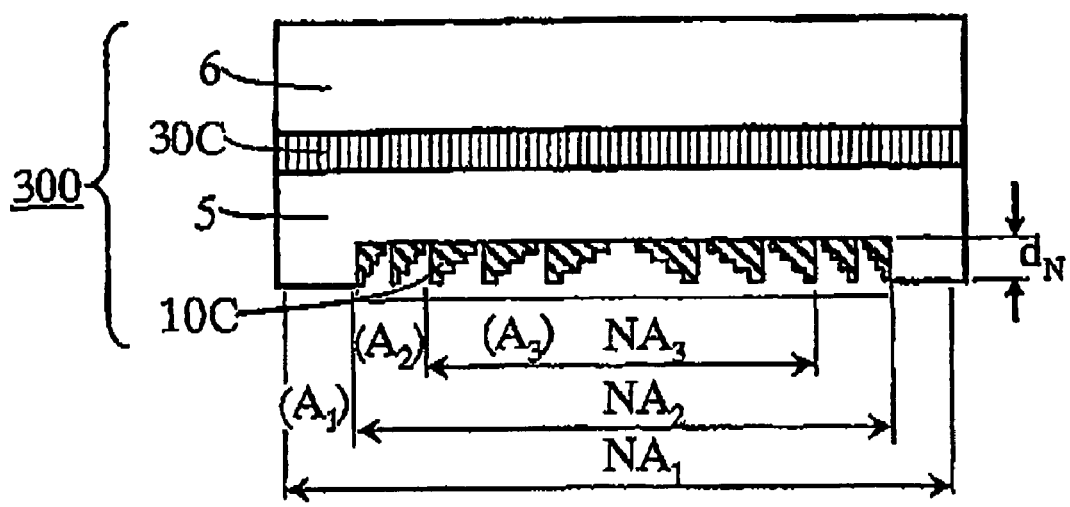
FIG. 4 is a cross-sectional view showing the construction of the phase correction element according to the third embodiment of the present invention.

Then, FIG. 4 is a cross-sectional view showing the construction of a third phase correction element 300 according to another embodiment of the present invention.

Here, the plan view is the same as FIG. 2.

The phase correction element 300 according to this embodiment, comprises a first phase correction layer 10C formed in a region of numerical aperture $NA_2$ on the surface of a transparent substrate 5 such as a glass, and a first phase plate 30C formed on one side of a transparent substrate 6 such as a glass. The first phase plate 30C has the same construction as the first phase plate 30A of the first phase correction element 100.

Here, in the same manner as the first phase correction layer 10B of the above second embodiment, the first phase correction layer 10C generates a wavefront aberration corresponding to (A) of FIG. 3 for incident light having a wavelength of $\lambda_2$, and corrects a wavefront aberration shown in (B) of FIG. 3 generated when the third phase correction element 300 is not employed. The first phase correction layer 10C is formed to have a saw-tooth-like cross-sectional shape (so-called blazed diffraction grating form) in a region of numerical aperture $NA_2$ on the surface of the transparent substrate such as glass, and is constituted by a multi-step-like blazed diffraction grating made of a homogeneous material whose convex portions (concavo-convex portion) of a saw-tooth-form are each approximated by a step-like grating. Here, the concavo-convex portion is formed to have a shape having a rotational symmetry with respect to the optical axis.

Here, the phase difference between transmitted light through the homogeneous material having a refractive index of n and transmitted light through the air in each step of the step-like grating, is made to be substantially a natural number times of $4\pi$ for a wavelength $\lambda_1$. In cases of $\lambda_1=410$ nm wavelength band and $\lambda_3=780$ nm wavelength band, considering the refractive index wavelength dispersion of the homogeneous material, the wavelength difference becomes substantially a natural number times of $2\pi$ at the wavelength $\lambda_3$ provided that it is substantially a natural number times of $4\pi$ at the wavelength $\lambda_1$. Therefore, by approximating each of convex portions of the saw-tooth-form by such a step-like grating, a first phase correction layer 10C is formed in which light having a wavelength of $\lambda_1$ or a wavelength of $\lambda_3$ is transmitted without changing the transmitted wavefront regardless of the polarization conditions of the incident light, and the transmitted wavefront of incident light having a wavelength of $\lambda_2$ is changed.

Further, the shape of the saw-tooth-like concavo-convex portion in the first phase correction layer 10C, is a Fresnel lens form constituted by a step-like grating shown in FIG. 2 and FIG. 4, and the shape is determined in the same manner as the first phase correction layer 10B.

In FIG. 4, the height $d_N$ of the step-like grating of (N+1) levels (namely N steps) is determined so that an optical path difference $(n-1) \times d_{N1}$ corresponding to the height $d_{N1}$ of one step obtained by equally dividing the height $d_N$ by N, becomes a natural number times of a $\lambda_3$=780 nm wavelength band for an optical disk for CD. For example, a case where $(n-1) \times d_{N1} = \lambda_3$ and light having a wavelength of $\lambda_2$ is incident into the first phase correction layer 10C processed to have such a step form, is considered. In this case, the phase of a transmitted wavefront becomes:

$$2\pi \times (n-1) \times d_{N1}/\lambda_2 = 2\pi \times (\lambda_3/\lambda_2)$$
$$= 2\pi \times 1.22$$

whereby the transmitted wavefront delays effectively by 0.22 wavelength per each step of the step-like grating. Therefore, by approximating the saw-tooth-like cross-sectional shape by a step form having a steps of N=3 to 5, a first phase correction layer 10C which only corrects a transmitted wavefront for an optical disk for DVD is obtained.

Figure 5:
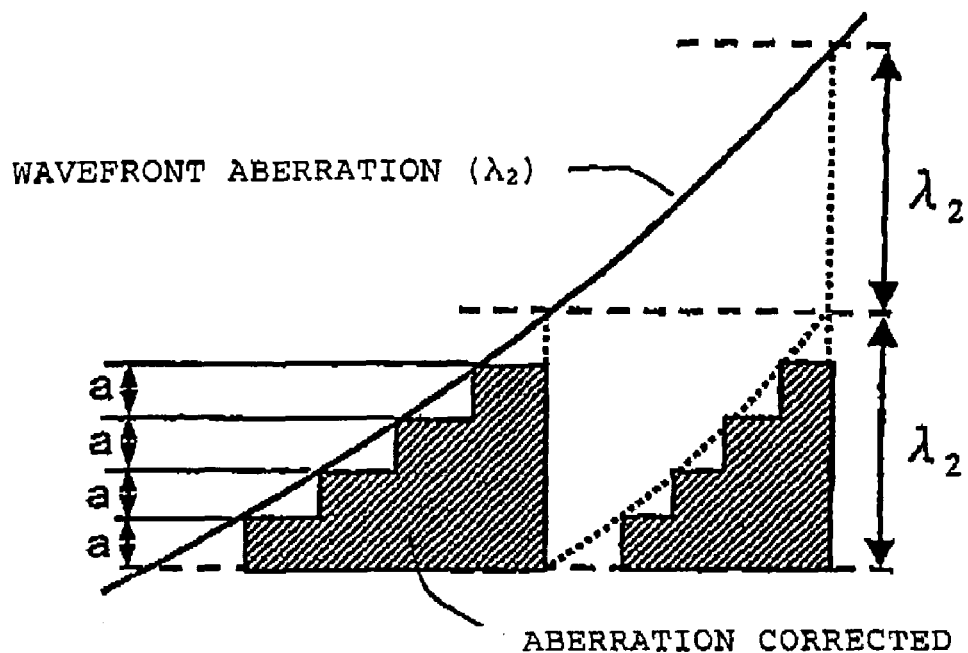
FIG. 5 is a partial enlarged view of wavefront aberration showing a correction function of wavefront aberration by the first phase correction layer of the phase correction element according to the third embodiment.

FIG. 5 is a partial enlarged view of wavefront aberration showing the wavefront aberration correction function of the first phase correction layer 10C. In FIG. 5, by dividing a wavefront aberration corresponding to one wavelength $\lambda_2$ by a correction amount of optical path difference "a" corresponding to the height $d_{N1}$ of one step of the step-like grating, namely, $a=\{(n-1) \times d_{N1}\} - \lambda_2$ as a unit, the wavefront aberration is approximately compensated. Here, FIG. 5 shows an example of correcting the aberration by a five-level (four steps) step-like grating. The first phase correction layer 10C may be formed by directly micro-fabricating the surface of the transparent substrate 5 into a step-like grating, or by fabricating a deposited film having a desired film thickness.

Therefore, the third phase correction element 300 has such an advantage that there is little limitation for materials employed for the first phase correction layer 10C or that the amount of fabrication is relatively small since there is a larger difference of the refractive index than air.

FOURTH EMBODIMENT

Figure 6:
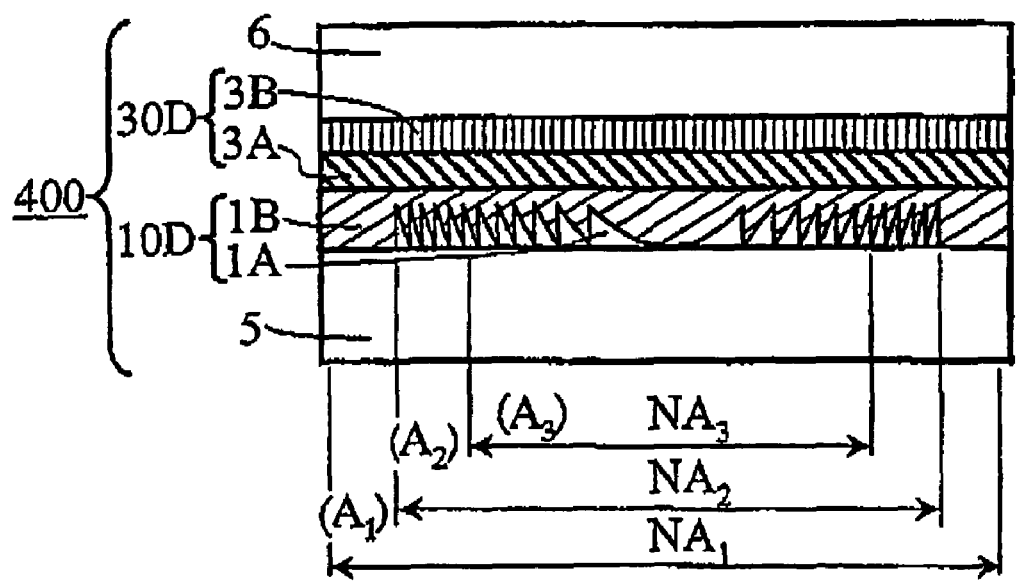
FIG. 6 is a cross-sectional view showing the construction of the phase correction element according to the fourth embodiment of the present invention.

Then, FIG. 6 is a cross-sectional view showing an example of the construction of a fourth phase correction element 400 according to a fourth embodiment of the present invention. Here, the plan view is the same as FIG. 2.

The phase correction element 400 of this embodiment employs as the first phase plate, a first phase plate 30D comprising two types of phase plates 3A and 3B made of birefringent materials having different retardation values, laminated so that their optical axes are at a predetermined angle to each other. Here, FIG. 6 shows a case where as the first phase correction layer 10D, the same phase correction layer as the first phase correction layer 10B of the second phase correction element 200 in FIG. 1 showing the second embodiment, is employed. However, the first phase correction layer 10C employed in the third phase correction element 300 of the third embodiment may also be employed as the first phase correction layer 10D.

The phase plates 3A and 3B constituting the first phase plate 30D, are made of a material having birefringency such as an optical crystal such as a high-molecular liquid crystal or quartz, or polycarbonate exhibiting birefringency by single-axis drawing. The phase plates 3A and 3B may be formed by laminating high-molecular liquid crystal films having different optical axes and retardation values on a transparent substrate 6, or by bonding a phase plate 3A made of polycarbonate to a phase plate 3B made of a high-molecular liquid crystal film formed on a transparent substrate 6 employing an adhesive. Further, it may be formed by employing a phase plate 3B made of quartz instead of the transparent substrate 6, and forming the phase plate 3A made of a high-molecular liquid crystal film.

When the phase plate 3A and the phase plate 3B are disposed from the side of the phase correction layer 10D in this order, and the angles of the fast axes of the phase plates 3A and 3B with respect to a polarization plane of linearly polarized incident light having a wavelength of $\lambda$ are designated as $\theta_A$ and $\theta_B$ respectively, and their retardation values are designated as $R_A$ and $R_B$ respectively, then the Stokes matrix component $S_3$ showing the polarization state of transmitted light through the laminated phase plate is represented by the following formula (1).

$$S_3 = \sin(\delta_A) \times [\sin(2\theta_A) - \{1-\cos(\delta_B)\} \times \sin(2\theta_B) \times \cos\{2(\theta_A - \theta_B)\}] + \cos(\delta_A) \times \sin(\delta_B) \times \sin(2\theta_B) \quad (1)$$

Here, $\delta_A$ and $\delta_B$ indicate birefringent phase difference of the phase plates 3A and 3B respectively at a wavelength of $\lambda$, and represented by the following formulae:

$$\delta_A = 2\pi R_A/\lambda$$

$$\delta_B = 2\pi R_B/\lambda$$

Further, the ellipticity K (the ratio of the minor axis vibration amplitude based on the major axis vibration amplitude of an elliptically polarized light) showing the linearity of polarization of the transmitted light is represented by the following formula employing $S_3$:

$$K = \tan\{0.5 \times \sin^{-1}(S_3)\}$$

Therefore, in order to form the first phase plate 30D to be a phase plate having a birefringent phase difference of about an odd number times of $\pi/2$ so as to function as a ¼ waveplate for incident light having three wavelengths of $\lambda_1$, $\lambda_2$ and $\lambda_3$, it is satisfactory that $\theta_A$, $\theta_B$, $R_A$ and $R_B$ are determined so that K takes 1, namely, $S_3$ takes a value close to 1 at each of these three wavelengths.

For example, a phase plate 3A having a birefringent phase difference $\delta_A \approx \pi$, namely, corresponding to ½ phase plate for a center wavelength $\lambda_C = (\lambda_1 + \lambda_2)/2$ of the wavelength $\lambda_1$ and the wavelength $\lambda_2$, and a phase plate 3B having a birefringent phase difference $\delta_B \approx \pi/2$, namely corresponding to a ¼ waveplate, are laminated so that the angle $|\theta_B - \theta_A|$ between their fast axes is 57±5°.

The angles of the fast axes are $\theta_A = 17 \pm 5°$ and $\theta_B = 74 \pm 5°$, or $\theta_A = 74 \pm 5°$ and $\theta_B = 17 \pm 5°$.

By forming the first phase plate 30D to be such laminated phase plate, it becomes a ¼ waveplate for three wavelengths generating a birefringent phase difference of about $\pi/2$ for linearly polarized light in a $\lambda_1$=410 nm wavelength band, that in a $\lambda_2=650$ nm wavelength band and that in a $\lambda_3=780$ nm wavelength band to convert each of them to circularly polarized light.

Here, the above construction of laminating the phase plate 3A and the phase plate 3B constituting the first phase plate 30D, is an example and the above $\theta_A$, $\theta_B$, $R_A$ and $R_B$ are not limited to the above ranges. $\theta_A$, $\theta_B$, $R_A$ and $R_B$ may be adjusted so as to obtain a desirable $S_3$ presented by the formula (1) depending on the purpose of polarization conversion at each wavelength, since the dependency of birefringent amount on wavelength differs depending on birefringent materials employed.

By employing the fourth phase correction element 400 integrated with such a first phase plate 30D, the fourth phase correction element 400 functions as a ¼ waveplate not only for incident light having a wavelength $\lambda_1$ but also for incident light having a wavelength of $\lambda_2$ and incident light having a wavelength of $\lambda_3$.

For this reason, in a case where the fourth phase correction element 400 is included in an optical head device to be used for recording and/or reproducing an information in three types of optical recording media using different wavelengths, recording and/or reproducing with an optical recording medium with high utilization efficiency of light is possible by using a combination with a polarizing beam splitter. Further, even when a polarizing beam splitter is not used, since reflected light from the optical recording medium is transformed into linearly polarized light having a polarization plane perpendicular to that of emitted light from a semiconductor laser light source as it shuttles through the first phase plate 30D, and incident into an emission point of the laser, it does not affect the emission operation of the semiconductor laser and stable emission light intensity can be obtained, which realizes stable recording and/or reproducing with high reliability.

FIFTH EMBODIMENT

Figure 7:
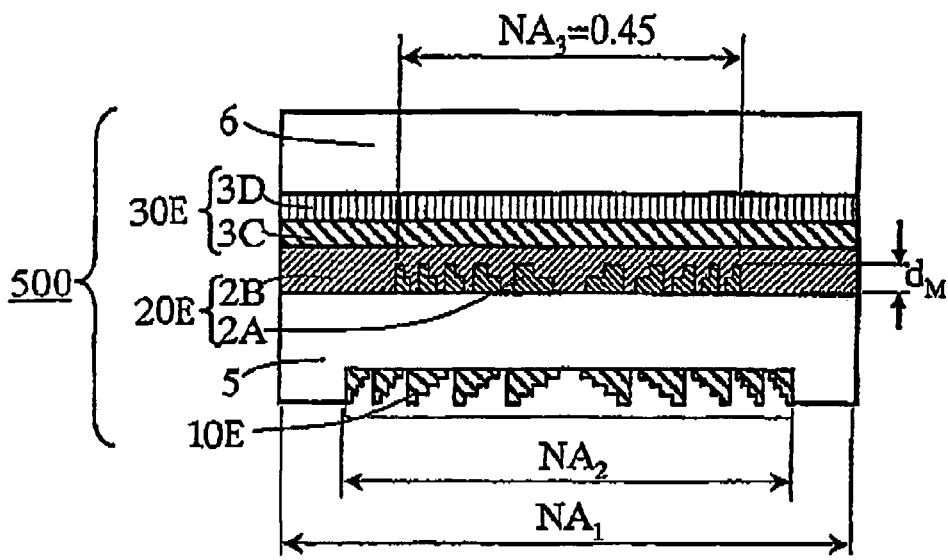
FIG. 7 is a cross-sectional view showing the construction of the phase correction element according to the fifth embodiment of the present invention.
Figures 8A, 8B:
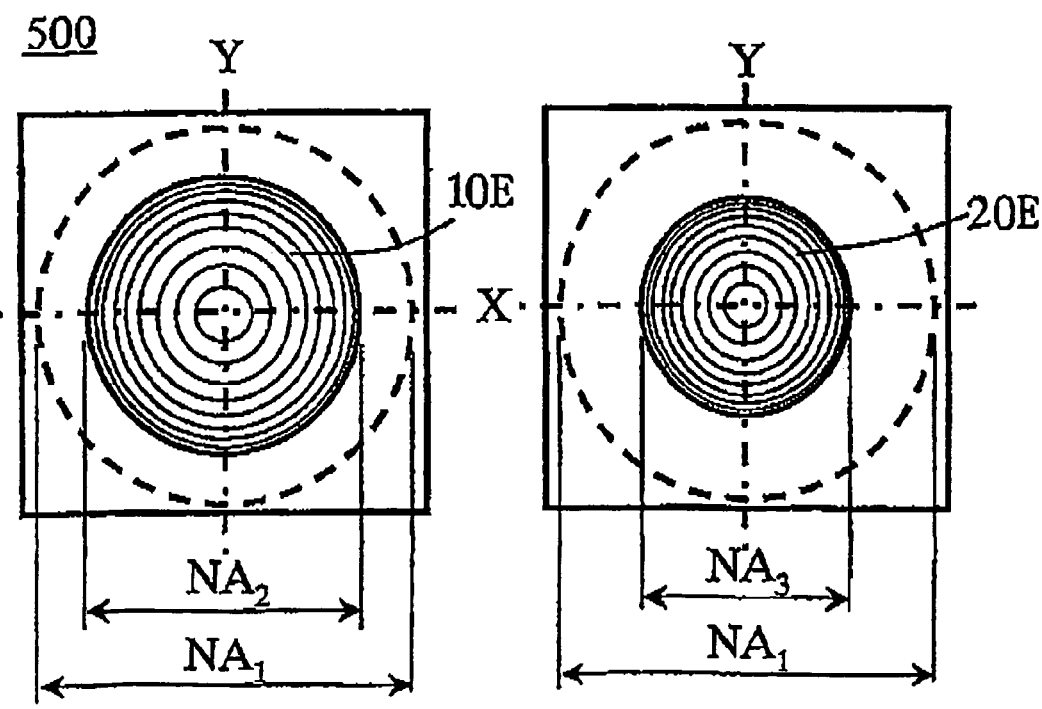
FIG. 8 is a plan view showing the construction of the phase correction element according to the fifth embodiment of the present invention.

Then, with respect to an example of the construction of a fifth phase correction element 500 according to the fifth embodiment of the present invention, FIG. 7 shows a cross-sectional view and FIG. 8 shows a plan view. Here, FIG. 8(a) shows an external appearance from the side where the first phase correction layer 10E is formed, and FIG. 8(b) shows an external appearance from the other side.

In the phase correction element 500 according to this embodiment, a first phase correction layer 10E is formed in a region of numerical aperture $NA_2$ on the surface of a transparent substrate 5 in the same manner as the third phase correction element 300, a second phase correction layer 20E is formed in a region of numerical aperture $NA_3$ on the other surface of the transparent substrate 5, and the first phase plate 30E is integrally formed. Here, the first phase correction layer 10E has the same construction as the first phase correction layer 10C of the third embodiment.

First of all, the second phase correction layer 20E will be described in detail as follows.

A wavefront aberration obtained by adding a power component to a spherical aberration generated when an objective lens for HD having a numerical aperture of $NA_1$ is employed for an optical disk for CD having a cover thickness of 1.2 mm in a $\lambda_3=780$ nm wavelength band with a numerical aperture of $NA_3$, corresponds to (B) of FIG. 3. The method for correcting the wavefront aberration by using the second phase correction layer 20E, is the same as the above-mentioned procedure for the first phase correction layers 10A and 10C.

The second phase correction layer 20E comprises a transparent substrate 5 such as glass and a high-molecular liquid crystal layer as a birefringent material layer having an ordinary refractive index $n_o$ and an extraordinary refractive index $n_e$ ($n_e>n_o$) formed in a region of numerical aperture $NA_3$ on the transparent substrate 5. Here, a solution of liquid crystal monomer is applied on an alignment film which is present on a transparent substrate and subjected to an alignment treatment, liquid crystal molecules are aligned so that their alignment vectors (molecular alignment axes) are in parallel in a specific direction in a plane in parallel to the substrate, and irradiated with light such as ultraviolet light beam to be polymerized and cured to form a high-molecular liquid crystal layer.

The high-molecular liquid crystal layer is fabricated to be a concavo-convex portion having a saw-tooth-like cross-sectional shape (so-called blazed diffraction grating type) in which each of convex portions of the saw-tooth-form is a blazed diffraction grating 2A approximated by a step-like grating, and having a rotational symmetry with respect to the optical axis. Namely, the concavo-convex portion is formed to have a concentric circular form in which the width of the bottom surface of the sow-tooth narrows from center towards the periphery. Then, at least concave portions of the concavo-convex portion of the high-molecular liquid crystal layer formed, are filled with a homogeneous refractive index transparent material 2B having a refractive index $n_s$ approximately equal to the ordinary refractive index $n_o$, to form a second phase correction layer 20E. Namely, a filler of the homogeneous refractive index transparent material 2B fills a space between the transparent substrate 5 on which a step-like blazed diffraction grating 2A constituted by a concavo-convex portion of high-molecular liquid crystal is formed, and the first phase plate 30E.

The second phase correction layer 20E receives incident light having a wavelength of $\lambda_1$ and incident light having a wavelength of $\lambda_2$ as ordinarily polarized incident light, and incident light having a wavelength of $\lambda_3$ as extraordinarily polarized incident light. By constructing it in this way, a second phase correction layer 20E can be obtained, which does not change transmitted wavefronts of light having a wavelength of $\lambda_1$ and light having a wavelength of $\lambda_2$, and changes a transmitted wavefront of light having a wavelength of $\lambda_3$ to correct a wavefront aberration generated to the light having a wavelength $\lambda_3$.

Here, the phase difference between light transmitted through a high-molecular liquid crystal layer having an extraordinary refractive index of $n_e$, and light transmitted through a homogeneous refractive index transparent material 2B having a refractive index of $n_s$ in each step of the step-like blazed diffraction grating 2A, is made to be approximately an odd number times of $2\pi$ with respect to a wavelength of $\lambda_1$. By approximating each of the convex portions of the saw-tooth-form by such a step-like grating, the second phase correction layer 20E is made, which has a wavelength-selection function of also transmitted extraordinarily polarized light having a wavelength of $\lambda_1$ without changing its transmitted wavefront, and changing the transmitted wavefront of extraordinarily polarized light having a wavelength of $\lambda_3$.

Further, the cross-sectional shape of the saw-tooth-like concavo-convex portion in the second phase correction layer 20E, is made to have a Fresnel lens form constituted by the step-like grating shown in FIG. 7 and FIG. 8(b) when $n_e>n_o$, and it is made to have a step-like grating having a reversed concavo-convex form when $n_e<n_o$.

The shape is determined as follows. Namely, an orbicular zone radius of each of the convex portions of the blazed diffraction grating 2A is determined from a plurality of orbicular zones obtained by slicing the wavefront aberration having a substantially parabolic cross-sectional shape shown in (B) of FIG. 3 and having a substantially paraboloid three-dimensional shape, at an interval of a wavelength $\lambda_3$ in the circular region of numerical aperture $NA_3$. By disposing these orbicular zones on a plane (a plane perpendicular to the paper in FIG. 3) of zero spherical aberration, in a concentric circular form around an axis of NA=0, the height of all of these orbicular zones are $\lambda_3$ and the cross-sectional shape becomes a saw-tooth-form.

Then, in FIG. 7, the optical path difference $(n_{e-ns}) \times d_{M1}$ of the height $dM_1$ of one step obtained by equally dividing the height $d_M$ of a step-like grating of (M+1) levels, (namely M steps), is made to be an odd number times of a $\lambda_1$=410 nm wavelength band of an optical disk for HD.

For example, a case where $(n_e - n_s) \times d_{M1} = \lambda_1$ and light having a wavelength of $\lambda_3$ is incident into the second phase correction layer 20E fabricated to have such a step form is considered. In this case, the phase of transmitted wavefront becomes:

$$2\pi \times (n_e - n_s) \times d_{M1} / \lambda_3 = 2\pi \times (\lambda_1 / \lambda_3)$$
$$= 2\pi \times 0.52$$

whereby the transmitted wavefront delays effectively by 0.52 wavelength per each step of the step-like grating.

Actually, the amount of delay of the transmitted wavefront becomes smaller than this value considering the refractive index wavelength dispersion of the high-molecular liquid crystal layer and the homogeneous liquid crystal transparent material. Accordingly, by approximating the saw-tooth-like cross-sectional shape by a step-like grating of M=1 or M=2, a second phase correction layer 20E is obtained, which corrects the transmitted wavefront of extraordinarily polarized light for an optical disk for CD. Here, by making the incident light having an wavelength $\lambda_2$ to be an ordinarily polarized light, the incident light is transmitted without having a change in the transmitted wavefront by the second phase correction layer 20E since the ordinary refractive index $n_o$ of the polymer liquid crystal and the refractive index $n_s$ of the homogeneous refractive index transparent material becomes approximately equal.

Figure 9:
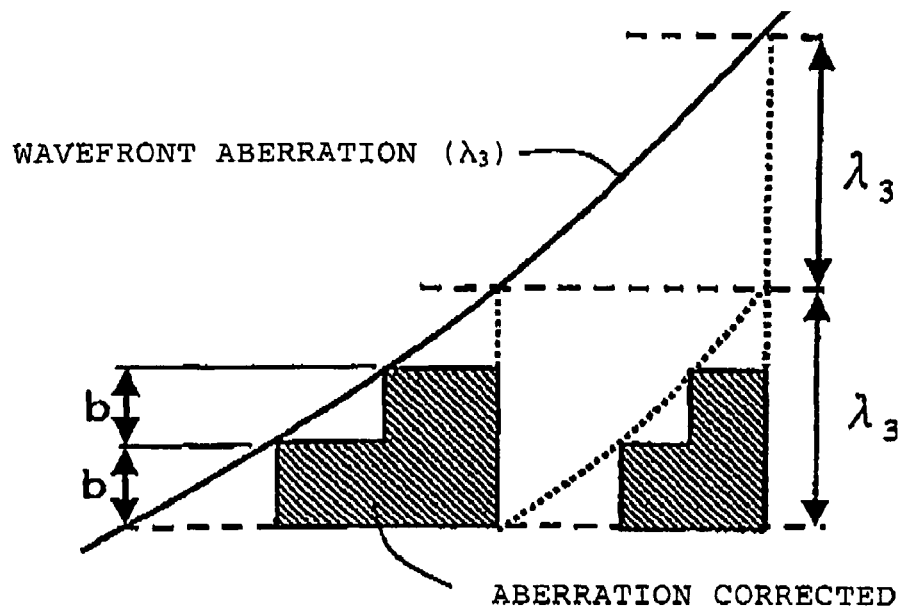
FIG. 9 is a partial enlarged view of wavefront aberration showing a correction function of wavefront by the second phase correction layer of the phase correction element according to the fifth embodiment.

FIG. 9 is a partial enlarged view of wavefront aberration, showing the wavefront aberration correction function of the second phase correction layer 20E at a wavelength $\lambda_3$. In FIG. 9, by dividing a wavefront aberration corresponding to one wavelength $\lambda_3$ by a correction amount of optical path difference "b" corresponding to the height $d_{M1}$ of one step of the step-like grating, namely:

$$b = (n_e - n_s) \times d_{M1},$$

the wavefront aberration is approximately corrected. Here, FIG. 9 shows an example of aberration correction by a step-like grating of three levels (two steps).

The above explanation is made assuming a case where the ordinary refractive index $n_o$ of the high-molecular liquid crystal layer as a birefringent material layer is equal to the refractive index $n_s$ of the homogeneous refractive index transparent material. However, in a case where the extraordinary refractive index $n_e$ is equal to $n_s$, the same function can be obtained by considering that the extraordinarily polarized light and the ordinarily polarized light are exchanged and fabricating the step-like grating of the high-molecular liquid crystal layer to have a shape correcting the wavefront aberration generated.

Here, in the above case, an example of employing a high-molecular liquid crystal as a birefringent material layer, is shown. However, the birefringent material may be any material so long as it has birefringency. For example, it may be an optical crystal such as quartz or lithium niobate, or an organic material such as polycarbonate exhibiting birefringency by single axis drawing. In the birefringent material has an optical axis of the refractive index ellipsoid is uniformly in one direction. In a case of e.g. a high-molecular liquid crystal, a molecular alignment axis corresponds to this.

Further, in the fifth phase correction element 500, a first phase correction layer 10E is also formed, which does not change the wavefront aberration of transmitted light having a wavelength of $\lambda_1$ and a wavelength of $\lambda_3$, and produces a wavefront aberration change correcting the wavefront aberration only for transmitted light having a wavelength of $\lambda_2$.

Therefore, a wavefront aberration generated when an objective lens for HD is employed for an optical disk for DVD with a wavelength $\lambda_2$ and a numerical aperture $NA_2$, can be corrected by the first phase correction layer 10E, and a wavefront aberration generated when it is employed for an optical disk for CD with a wavelength $\lambda_3$ and a numerical aperture $NA_3$, can be corrected by the second phase correction layer 20E. These corrections can be made independently from each other.

Namely, the second phase correction layer 20E employed for the fifth phase correction element 500, does not change the transmitted wavefront of light having a wavelength of $\lambda_1$ regardless of the polarization state. On the other hand, it does not change the transmitted wavefront of ordinarily polarized light having a wavelength of $\lambda_2$ and a wavelength of $\lambda_3$. However, it changes the transmitted wavefront of extraordinarily polarized light depending on the shape of the blazed diffraction grating 2A having a step-form.

Therefore, when the fifth phase correction element 500 is employed as it is integrated with an objective lens and mounted in an optical head device, and when polarizations of incident light having a wavelength of $\lambda_2$ and incident light having a wavelength of $\lambda_3$ in an incoming path of light propagation from the light source to the optical disk, are made to be ordinary polarization and extraordinary polarization respectively, a transmitted wavefront of only the incident light having a wavelength of $\lambda_3$ is changed in the second phase correction layer 20E so that a desired wavefront aberration is corrected.

However, since light reflected by the optical disk and entering into the phase correction element 500 in the returning path shuttles through the first phase plate 30E, it usually has a different polarization state from that in the incoming path. When an extraordinary polarization component of light having a wavelength of $\lambda_2$ is generated, the transmitted wavefront through the second phase correction layer 20E is changed and a wavefront aberration is generated. Further, when the ordinary polarization component of wavelength $\lambda_3$ is generated, the original wavefront aberration remains since the second phase correction layer 20E does not change a transmitted wavefront so as to correct the wavefront aberration. As a result, a problem that a sufficient signal light can not be collected in a photo-acceptance plane of a photodetector in the returning path.

For example, in a case of employing a conventional ¼ waveplate as the first phase plate which produces a birefringent phase difference of $\pi/2$ at a wavelength $\lambda_1$, there remains about $\pi/2$ of birefringent phase difference after the reciprocation of light having a wavelength $\lambda_2$ and a wavelength $\lambda_3$ through this phase plate, which produces a polarization component for generating a wavefront aberration.

Therefore, in order to solve such problem, the first phase plate 30E is employed, which generates a birefringent phase difference of about an odd number times of $\pi/2$ for linearly polarized light in a $\lambda_1$=410 nm wavelength band to transform it into circularly polarized light, and generates a birefringent phase difference of about an odd number times of $\pi$ for linearly polarized light in a $\lambda_2$=650 nm wavelength band and linearly polarized light in a $\lambda_3$=780 nm wavelength band to rotate their polarization planes. An example of the construction is described using a cross-sectional view shown in FIG. 7.

In a case where the first phase plate 30E has a dual layer construction comprising two types of phase plates 3C and 3D made of birefringent materials having different retardation values which are disposed in this order from the side of the second phase correction layer 20E wherein the angles of the optical axes of the phase plates 3C and 3D with respect to the polarization plane of the linearly polarized incident light having a wavelength of $\lambda_1$ are designated as $\theta_C$ and $\theta_D$ respectively and their retardation values are designated as $R_C$ and $R_D$ respectively, it is satisfactory that $\theta_C$, $\theta_D$, $R_C$ and $R_D$ are determined so that the ellipticity $\kappa$ calculated from $S_3$ as the Stokes matrix component of transmitted light through a laminated waveplate represented by the above formula (1), becomes substantially 1 at a wavelength $\lambda_1$, and at most 0.1 at a wavelength $\lambda_2$ and a wavelength $\lambda_3$.

Specifically, the phase plate 3C having a birefringent phase difference of $\delta_C \approx \pi/2$, namely, corresponding to a ¼ phase plate at a wavelength $\lambda_1$, and a phase plate 3D having a birefringent phase difference of $\delta_D \approx \pi$, namely, corresponding to a ½ waveplate, are laminated so that the angle $|\theta_D - \theta_C|$ formed between their optical axes becomes 45±5°. The angle of the optical axis of the phase plate 3C is made to be $\theta_C \approx 45 \pm 5°$. By constructing such a laminated phase plate, a desired first phase plate 30E for three wavelengths can be obtained.

Therefore, ordinarily polarized light having a wavelength of $\lambda_1$ becomes extraordinarily polarized light after it comes and returns through the first phase plate 30E in the fifth phase correction element 500, ordinarily polarized light having a wavelength of $\lambda_2$ remains in ordinarily polarized, and ordinarily polarized light having a wavelength of $\lambda_3$ remain in extraordinarily polarized light. As a result, the transmitted wavefront of a wavelength $\lambda_1$ does not change in the incoming path and the returning path, the transmitted wavefront of a wavelength $\lambda_2$ is corrected only by the first phase correction layer 10E, and the transmitted wavefront of a wavelength $\lambda_3$ is corrected only by the second phase correction layer 20E.

SIXTH EMBODIMENT

Figure 10:
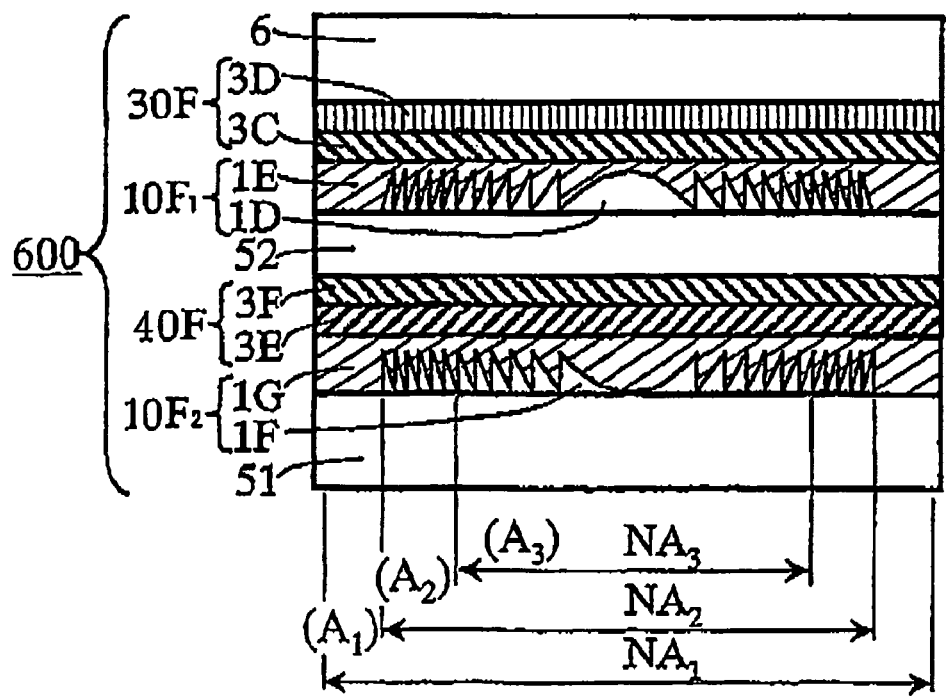
FIG. 10 is a cross-sectional view showing the construction of the phase correction element according to the sixth embodiment of the present invention.

Then, FIG. 10 shows a cross-sectional view of an example of the construction of the sixth phase correction element 600 according to the sixth embodiment of the present invention.

The phase correction element 600 according to this embodiment comprises a first phase plate 30F generating a birefringent phase difference of substantially an odd number times of $\pi/2$ for linearly polarized light in a $\lambda_1$=410 nm wavelength band to transform it into circularly polarized light and generating a birefringent phase difference of substantially an odd number times of $\pi$ for linearly polarized light in a $\lambda_2$=650 nm wavelength band and in a $\lambda_3$=780 nm wavelength band to rotate their polarization planes, and a second phase plate 40F generating a birefringent phase difference of substantially an even number times of $\pi$ for linearly polarized light in a $\lambda_1$=410 nm wavelength band and generating a birefringent phase difference of substantially odd number times of $\pi$ for linearly polarized light in a $\lambda_2$=650 nm wavelength band and linearly polarized light in a $\lambda_3$=780 nm wavelength band to rotate their polarization planes by substantially 90°, a first polarizing phase correction layer 10F$_1$ and a second polarizing phase correction layer 10F$_2$, wherein the first phase plate 30F, the first polarizing phase correction layer 10F$_1$, the second phase plate 40F and the second polarizing phase correction layer 10F$_2$ are disposed in this order. Here, numerical references 51 and 52 indicate transparent substrates on which polarizing phase correction layers 10F$_2$ and 10F$_1$ are formed.

On transparent substrates 52 and 51 such as glass, high-molecular liquid crystal layers as birefringent materials each having an ordinary refractive index of $n_o$ and an extraordinary refractive index of $n_e$ in which the optical axes are aligned in one direction, are formed in a region of the numerical aperture $NA_2$. Each of the high-molecular liquid crystal layers is constituted by saw-tooth-like gratings 1D or 1F which is processed to have a saw-tooth-like concavo-convex portion having a cross-sectional shape of a saw-tooth-form or each convex portion of the saw-tooth-form being approximated by step-like grating, and having a rotational symmetry with respect to the optical axis. At least concave portions of the concavo-convex portion of the high-molecular liquid crystal layers are filled with homogeneous refractive index transparent materials 1E and 1G having a refractive index $n_s$ substantially equal to the ordinary refractive index $n_o$.

With this construction, the first polarizing phase correction layer 10F$_1$ is constituted by the saw-tooth-like grating 1D and the homogeneous refractive index transparent material 1E, and the second polarizing phase correction layer 10F$_2$ is constituted by the saw-tooth-like grating 1F and the homogeneous refractive index transparent material 1G.

As shown in FIG. 10, slopes of saw-teeth of the saw-tooth-like grating 1F and vertical faces of the sow-teeth of the saw-tooth-like grating 1D face the central axis of the concentric circular grating pattern. Therefore, in a case of $n_e > n_o$, when a plane wave of extraordinarily polarized light is incident, the wavefront of the light transmitted through the saw-tooth-like grating 1F becomes a divergent spherical wave, and the wavefront of light transmitted through the saw-tooth-like grating 1D becomes a convergent spherical wave. The saw-tooth-like gratings 1F and 1D have functions of a concave lens and a convex lens respectively.

Further, in the polarizing phase correction layers 10F$_1$ and 10F$_2$, directions of the high-molecular liquid crystal processed to be the saw-tooth-like gratings 1D and 1F, are aligned, and the transmitted wavefront does not change for ordinarily polarized light but the transmitted wavefront is changed for extraordinarily polarized light depending on a distribution of saw-tooth-like concavo-convex portion.

Here, in a case of $n_e < n_o$, the saw-tooth-like gratings 1F and 1D be processed so that they have opposite concavo-convex forms. Further, in a case of $n_e = n_s$, exchanging of the extraordinarily polarized and the ordinarily polarized light is considered, and the same function can be obtained by processing the saw-tooth-like gratings 1F and 1D to have concavo-convex forms shown in FIG. 10 in a case of $n_e < n_o$ and by processing them to have inversed concavo-convex forms in a case of $n_e > n_o$.

Therefore, the wavefront aberration shown in FIG. 3(B) generated when an objective lens for HD is employed for an optical disk for DVD with a wavelength of $\lambda_2$ and a numerical aperture of $NA_2$, or when it is used for an optical disk for CD with a wavelength of $\lambda_3$ and a numerical aperture aperture of $NA_3$, can be corrected by processing the high-molecular liquid crystal layer 1F so that a wavefront aberration generated to extraordinarily polarized light having a wavelength of $\lambda_2$ and that having a wavelength of $\lambda_3$ transmitted through the polarizing phase correction layer $10F_2$, corresponds to (A) of FIG. 3. This is the same as the case of the correction by the first phase correction layer 10B in the second phase correction element 200 shown in FIG. 1.

On the other hand, the first phase plate 30F has the same construction and function as the first phase plate 30E employed in the fifth phase correction element 500, and functions as a ¼ phase plate for linearly polarized light having a wavelength of $\lambda_1$ and transform it to circularly polarized light, and functions as a ½ phase plate for linearly polarized light having a wavelength of $\lambda_2$ and that having a wavelength of $\lambda_3$ to rotate their polarization planes.

Further, the second phase plate 40F passes the light of wavelength $\lambda_1$ maintaining the polarization state of the incident light, and functions as a ½ phase plate rotating the polarization planes by about 90° for linearly polarized light having a wavelength of $\lambda_2$ and that having a wavelength of $\lambda_3$.

In the specific construction of the second phase plate 40F, the phase plate 3E and the phase plate 3F each having a birefringent phase difference of about $2\pi$ corresponding to about one wavelength for a wavelength of $\lambda_1$, are laminated so that their optical axes are at an angle of about 45° to each other. Namely, when the birefringent phase differences of the phase plates 3E and 3F at a wavelength $\lambda_1$ are $\delta_E$ and $\delta_F$ respectively and the angles of their fast axes to the polarization plane of the incident light are $\theta_E$ and $\theta_F$ respectively, they have the following relations.

$\delta_E = \delta_F \approx 2\pi$ and $|\theta_F - \theta_E| = 45 \pm 5°$.

In an incoming path where incident light from a light source is converged on an optical disk, linearly polarized light in a $\lambda_1$=410 nm wavelength band is incident into the second polarizing phase correction layer $10F_2$ as ordinarily polarized light, and is straightly transmitted without being diffracted, and is transmitted through the second phase plate 40F as it is ordinarily polarized light. Accordingly, it is transmitted through the first polarizing phase correction layer $10F_1$ without being diffracted and transmitted through the first phase plate 30F to be circularly polarized light.

Further, linearly polarized light in a $\lambda_2$=650 nm wavelength band and that in a $\lambda_3$=780 nm wavelength band, are each incident into the second polarizing phase correction layer $10F_2$ as an extraordinarily polarized light, diffracted and transmitted through the second phase plate 40F to be ordinarily polarized light, straightly transmitted through the first polarizing phase correction layer $10F_1$ without being diffracted, and is transmitted through the first phase plate 30F with the polarization plane rotated.

Here, the blazed diffraction grating formed on the second polarizing phase correction layer $10F_2$, has preferably a blazed grating having a saw-tooth-form in cross section and is adapted so that a phase difference of wavefronts of light transmitted through the concavo-convex portion of the grating is about one wavelength of the wavelength $\lambda_2$ or the wavelength of $\lambda_3$ between the concave portion and the convex portion. Further, the blazed diffraction grating has a concentric orbicular-zone-like grating pattern formed to correct a spherical aberration generated by a first order diffraction light in an optical head device.

On the other hand, in a returning path where light reflected by an optical disk is converged on a photodetector, linearly polarized light having a wavelength of $\lambda_1$ come and returns through the first phase plate 30F to be an extraordinarily polarized light and is incident into the first polarizing phase correction layer $10F_1$. Then the light is diffracted and transmitted through the second phase plate 40F as it is the extraordinarily polarized light, and diffracted again in the second polarizing phase correction layer $10F_2$.

Further, light having a wavelength of $\lambda_2$ and light having a wavelength of $\lambda_3$ are each reformed into the original ordinarily polarized light by being rotated polarization plane in the phase plate 30F, and straightly transmitted through the first polarizing phase correction layer $10F_1$ without being diffracted, and transmitted through the second phase plate 40F to be extraordinarily polarized light, and diffracted by the second polarizing phase correction layer $10F_2$ in the same manner as the incoming path. Here, the second phase correction layer $10F_2$ is formed so as to have a high first order diffraction efficiency to extraordinarily polarized lights having a wavelength of $\lambda_2$ and that having a wavelength of $\lambda_3$, and accordingly, second order diffraction light is mainly generated when ordinarily polarized light having a wavelength of $\lambda_1$ is incident.

Accordingly, the blazed diffraction grating pattern of the first polarizing phase correction layer $10F_1$ is formed to have the same wavefront state as the incident light to the phase correction element 600 in the incoming path by the multi-diffraction of the diffraction light having a convergent transmitted wavefront generated at the first polarizing phase correction layer $10F_1$ and the second polarizing phase correction layer $10F_2$ when the extraordinarily polarized light having a wavelength $\lambda_1$ is incident in the returning paths. In this case, the order number of the diffraction light of a wavelength of $\lambda_1$ by the first polarizing phase correction layer $10F_1$, may be first or second. However, its diffraction direction with respect to the central axis of the concentric circular grating pattern is opposite from that of the second polarizing phase correction layer $10F_2$.

With the construction of the phase correction element 600 of this embodiment, transmitted wavefront of ordinarily polarized incident light having a wavelength of $\lambda_1$ is not changed in the incoming and returning paths, and is transformed into an extraordinarily polarized light that is perpendicular to the incident light after it come and returns.

On the other hand, the function of changing the transmitted wavefront of extraordinarily polarized incident light having a wavelength of $\lambda_2$ and that having a wavelength of $\lambda_3$ so as to correct the wavefront aberration in the incoming path and the returning path can be obtained. Namely, by combining the second polarizing phase correction layer $10F_2$, the second phase plate 40F and the first polarizing phase correction layer $10F_1$, the same function as that of the first polarizing phase correction layer 10B in the second phase correction element 200 can be obtained.

When the above-mentioned first to sixth phase correction elements 100 to 600 are mounted as compatible elements for three types of optical disks of HD, DVD and CD in optical head devices, it is preferred to combine an aperture-limiting element for limiting incident light beam of wavelengths $\lambda_1$, $\lambda_2$ and $\lambda_3$ to be numerical apertures $NA_1$, $NA_2$ and $NA_3$ respectively. The aperture-limiting element may be disposed separately from the phase correction element of the present invention. However, it is preferred to form the phase correction element to have the aperture-limiting function whereby the device can thereby be small in size and light in weight, and adjustment work for fitting become unnecessary.

Further, in the phase correction element of the present invention, a light beam of a wavelength of $\lambda_2$ whose transmitted wavefront is changed by the first phase correction layer formed in the area corresponding to the numerical aperture $NA_2$ for DVD, is converged in a focal plane of an objective lens different from that of a light beam of a region outside the area of a numerical aperture $NA_2$ when a large power component is applied to the transmitted wavefront, in addition to a spherical aberration correction component. Namely, when the light beam of the numerical aperture $NA_2$ is converged on an information recording plane of an optical disk, it is not detected as a signal light by the photodetector of the optical head device since the light beam of an outer area is not converged on the information recording plane, and as a result, the first phase correction layer has an aperture-limiting function of the numerical aperture of $NA_2$ to incident light having a wavelength of $\lambda_2$.

In the same manner, in the fifth phase correction element 500 shown in FIG. 7, the light beam of a wavelength $\lambda_3$ whose transmitted wavefront is changed by the second phase correction layer 20E formed in the region corresponding to the numerical aperture $NA_3$ for CD, is converged on a focal plane of an objective lens different from that of the light beam of the outer area of the numerical aperture $NA_3$ if a large power component is added to the transmitted wavefront. Namely, it is not detected as a signal light by the photodetector of the optical head device, and as a result, the second phase correction layer 20E has an aperture-limiting function of the numerical aperture $NA_3$ to incident light having a wavelength $\lambda_3$.

In a case where the first phase correction layer and the second phase correction layer have functions of generating large power components, it is not necessary to add an additional aperture-limiting function to the phase correction element.

However, in a case where there is little power component imparted to the transmitted wavefront by the phase correction layer and a light beam out of a predetermined numerical aperture is incident into the photodetector as a stray light, stable recording and/or reproducing can not be performed. In particular, in a case of a phase correction element having only the first phase correction layer formed in the region corresponding to an aperture of $NA_2$, it is preferred to provide an aperture-limiting function for limiting the light beam of a wavelength of $\lambda_3$ for CD to $NA_3$.

Then, various embodiments of the aperture limitation formed integrally with the phase correction element of the present invention, will be described.

SEVENTH EMBODIMENT

Figure 11:
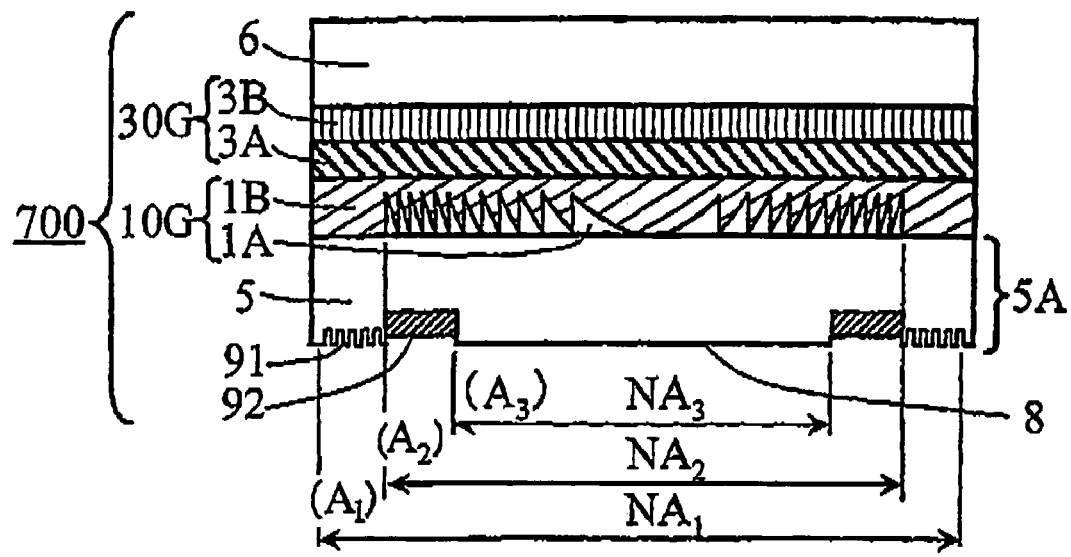
FIG. 11 is a cross-sectional view showing the construction of the phase correction element according to the seventh embodiment of the present invention.
Figure 12:
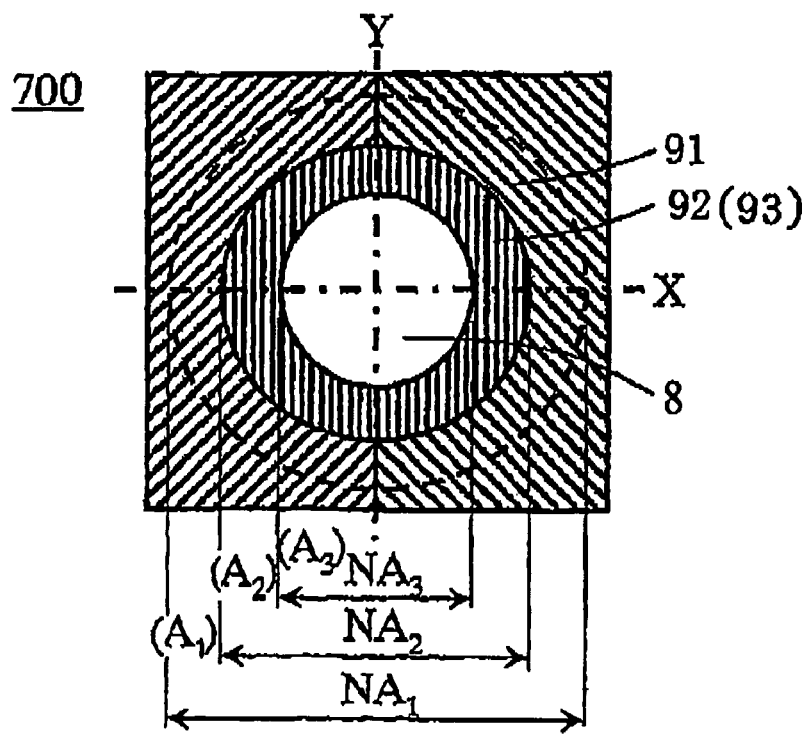
FIG. 12 is a plan view showing the construction of the phase correction element according to the seventh embodiment of the present invention.

With respect to the seventh phase correction element 700 according to the seventh embodiment of the present invention, a cross-sectional view is shown in FIG. 11 and a plan view is shown in FIG. 12.

On a surface of a transparent substrate 5, a diffraction grating 91 having a cross-sectional shape of a rectangular concavo-convex form with a ratio of the lengths between the concave portion and the convex portion of 1:1, and having a wavelength phase difference corresponding to a wavelength $\lambda_1$, is formed in a first orbicular region $(A_1)$ which is the difference between a circular region of aperture $NA_1$ and a circular region of aperture $NA_2$. This construction provides an aperture-limiting function that since the wavelength phase difference between the concave portion and the convex portion is substantially ½ of the wavelength $\lambda_2$ and the wavelength $\lambda_3$, incident light having a wavelength of $\lambda_1$ is straightly transmitted and incident light having a wavelength of $\lambda_2$ and incident light having a wavelength of $\lambda_3$ are diffracted, whereby straightly transmitted light becomes at most 30%. The same wavelength-selection function is exhibited when the wavelength phase difference between the concave portion and the convex portion is substantially an integer times of the wavelength $\lambda_1$ and it is non-integer times of the wavelength $\lambda_2$ and the wavelength $\lambda_3$, preferably a value close to an odd number times of ½ of these wavelengths.

Further, in a second annular region $(A_2)$ which is the difference between the circular region of aperture $NA_2$ and the circular region of aperture $NA_3$ on the surface of the transparent substrate 5, a multi-layer film filter 92 having such construction that a transparent dielectric film (not shown) having a relatively high refractive index and a transparent dielectric film (not shown) having a relatively low refractive index are alternately laminated wherein each of the optical films is in the order of the wavelength, is formed.

In the multi-layer film filter 4A, the refractive indexes, the number of layers of two types of transparent dielectric material and the film thickness of each layer are determined according to a conventional multi-layer film filter design procedure so that the filter transmits at most 90% of light having a wavelength of $\lambda_1$ and light having a wavelength of $\lambda_2$ and reflects at most 70% of light having a wavelength of $\lambda_3$. As the transparent dielectric material film having a high refractive index, $TiO_2$, $Ta_2O_5$, $Nb_2O_5$, $ZrO_2$ or the like is employed, and as the transparent dielectric film of low refractive index, $SiO_2$, $MgF_2$ or the like is employed.

With the surface of the transparent substrate 5 having such structure, an aperture-limiting substrate 5A having a wavelength-selectivity by which incident light having a wavelength of $\lambda_1$ is straightly transmitted through the area of numerical aperture $NA_1$ and incident light having a wavelength of $\lambda_2$ is straightly transmitted in a region of numerical aperture $NA_2$, and incident light having a wavelength of $\lambda_3$ is straightly transmitted through a region of numerical aperture $NA_3$. Here, the seventh phase correction element 700 may comprise any one of the first to the sixth phase correction element in the construction except for the aperture-limiting substrate 5A. FIG. 11 shows a case of employing the fourth phase correction element 400.

Here, it is preferred to provide a step for phase correction in at least one region from the first annular region $(A_1)$, the second annular region $(A_2)$ and the annular region $(A_3)$ on the surface of the aperture-limiting substrate 5A so that a wavefront of light having a wavelength of $\lambda_1$ transmitted through the region of numerical aperture $NA_1$ (including all inside areas) of the aperture-limiting substrate 5A, does not change and a wavefront of light having a wavelength of $\lambda_2$ transmitted through the region of numerical aperture $NA_2$ (including all inside areas) does not change.

There is a case that the step for phase adjustment is formed by directly processing the transparent substrate 5, and a case that it is formed after the transparent dielectric film is formed on the surface of the transparent substrate 5. In both cases, it is preferred to form an antireflection film 8 to impart antireflective function so that the circular region $(A_3)$ transmits three types of incident light having wavelengths of $\lambda_1$, $\lambda_2$ and $\lambda_3$, respectively.

Figure 13:
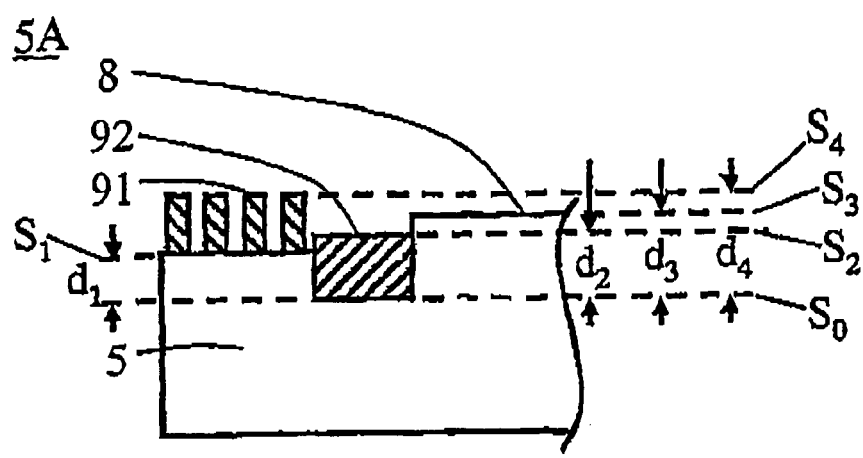
FIG. 13 is an enlarged cross-sectional view showing the positional relation among processed surfaces of the aperture-limiting substrate of the seventh phase correction element shown in FIGS. 11 and 12.

Then, the aperture-limiting substrate 5A of FIG. 11 is specifically described using FIG. 13 of partially enlarged cross-sectional view.

FIG. 13 shows a case where the surface ($S_0$ surface) of the annular region $(A_2)$ is processed to have a stepped surface for phase adjustment so that the step interval with respect to the surface of the circular region $(A_3)$ is $d_3$ by processing the surface of the transparent substrate 5.

A diffraction grating 91 having a concavo-convex like cross-sectional shape is formed in the annular region $(A_1)$, wherein the surface of the concave region is designated as $S_1$ and the distance between $S_0$ and $S_1$ is designated as $d_1$. Further, the surface of the convex portion of the concavo-convex like diffraction grating 91 is designated as $S_4$, and the distance between $S_0$ and $S_4$ is designated as $d_4$. Further, a multi-layer film filter 92 is formed only in the circular region ($A_2$), and the surface of the multi-layer film filter 92 is designated as $S_2$, and the distance between the $S_0$ and $S_2$, namely the film thickness of the multi-layer film filter 92, is designated as $d_2$.

Here, in order to prevent the transmitted wavefront of an incident light having a wavelength of $\lambda_1$ straightly transmitted through a region of numerical aperture $NA_1$ from being changed to generate a wavefront aberration, each of the circular region ($A_1$), the circular region ($A_2$) and the circular region ($A_3$) is constructed to produce a wavelength phase difference of an integer times of the wavelength $\lambda_1$ for light having a wavelength of $\lambda_1$ transmitted through the region.

Further, in order to prevent the wavefront of an incident light having a wavelength of $\lambda_2$ straightly transmitted through the region of aperture $NA_2$ from being changed to cause a wavefront aberration, each of the annular region ($A_2$) and the circular region ($A_3$) is constructed to produce a wavelength phase difference of an integer times of the wavelength of $\lambda_2$ for light having the wavelength of $\lambda_2$ transmitted through the region.

A diffraction grating 91 in the annular region ($A_1$) being in contact with the air, is processed so that the depth of the concave portion of the refractive index n becomes $(d_4-d_1)=\lambda_1/(n-1)$ so that the wavelength phase difference between a concave portion and a convex portion become the wavelength $\lambda_1$, and an incident light having a wavelength of $\lambda_1$ is straightly transmitted without being diffracted, and transmitted wavefronts through the concave portion and the convex portion of the diffraction grating 91 are in phase.

Therefore, the wavelength phase difference of the transmitted light having a wavelength of $\lambda_1$ caused by the difference between the optical path between $S_0$ surface and $S_1$ or $S_4$ surface of the annular region ($A_1$) and an optical path between $S_0$ surface and $S_3$ surface of the circular region ($A_3$), have to be an integer number times of wavelength $\lambda_1$.

As a result, since no phase difference is generated between the annular region ($A_1$) and the circular region ($A_3$) with respect to the transmitted light of wavelength $\lambda_1$, only the phase difference of transmitted light having a wavelength of $\lambda_1$ and light having a wavelength $\lambda_2$ between the annular region ($A_2$) and the circular region ($A_3$), have to be adjusted.

When the multi-layer film filter 92 having a total film thickness of $d_2$ in the annular region ($A_2$) is assumed to be a homogeneous layer having an average refractive index $n_M$, and an increase of the optical path by a multiple reflection at the interface between films having different refractive indexes inside of the multi-layer film filter 92 is taken account as an average refractive index $n_M$, the optical paths $L_2$ and $L_3$ from $S_0$ surface to $S_2$ and $S_3$ surfaces in the annular region ($A_2$) and the circular region ($A_3$), are represented by the following formulae (2) and (3) respectively:

$$L_2 = n_M \cdot d_2 + (d_3 - d_2) \quad (2)$$

$$L_3 = n_3 \cdot d_3 \quad (3)$$

Here, $n_3$ indicates the average refractive index of a portion between $S_0$ surface and $S_3$ surface including an antireflective film 8 in the circular region ($A_3$).

Therefore, by processing $S_0$ surface to form $S_3$ surface so as to satisfy the relation between the construction of the multi-layer filter 92 (total film thickness $d_2$ and average refractive index $n_M$) and the construction of the circular region ($A_3$) (total film thickness $d_3$ and average refractive index $n_3$) so that the wavelength phase difference of ($L_2-L_3$) becomes about an integer number times of the wavelength $\lambda_1$ and about an integer times of the wavelength $\lambda_2$, the transmitted wavefronts of light having a wavelength of $\lambda_1$ and light having a wavelength of $\lambda_2$ through the $NA_2$ region do not change, and no wavefront aberration by the aperture-limiting substrate 5A is generated. As a result, when the seventh phase correction element 700 is employed together with an objective lens of an optical head device, incident light is effectively converged on an information recording plane of optical disks for HD and DVD.

Further, after multi-layer film filters having the same construction are formed in the annular region ($A_1$) and the annular region ($A_2$), the diffraction grating 91 may be formed only in the annular region ($A_1$).

Further, the step for phase adjustment is formed by processing the surface in the annular region ($A_2$) of the transparent substrate 5 in the above embodiment. However, the step for the phase adjustment may be formed by depositing a transparent dielectric film only in the annular region ($A_1$) and the circular region ($A_3$) on the surface of the transparent substrate 5 so as to satisfy $d_1=d_3$.

Here, the diffraction grating 91 is formed on the transparent dielectric film in the annular region ($A_1$) so as to form convex portions having a refractive index of n with a concavo-convex depth of $(d_4-d_1)=\lambda_1/(n-1)$.

Here, when a transparent dielectric film for phase adjustment is deposited in the circular region ($A_3$), it is preferred to employ a single layer of intermediate refractive index dielectric material made of a mixture or a compound of a low-refractive index dielectric material and a high-refractive index dielectric material. By adjusting the refractive index of the intermediate refractive index dielectric material, the thicknesses of the transparent dielectric film and the multi-layer film filter 92 can be made equal ($d_2=d_3$), and accordingly, e.g. a phase correction layer can further be formed on the surface.

Here, the plan pattern of the diffraction grating 91 is designed not to have a twice rotational symmetry with respect to the optical axis of a transmitted light. For example, in FIG. 12, two-divided grating patterns being symmetrical with respect to Y axis are formed, and they do not have a twice rotational symmetry with respect to the optical axis. In the case of the two-divided grating patterns, the two-divided grating patterns may have a concentric circular form or a form in which the grating pitch is not even.

By forming such a grating pattern, light diffracted by the diffraction grating 91 in the incoming path and reflected by the information recording plane of an optical disk, is diffracted again by the diffraction grating 91 in the returning path, whereby it is possible to prevent it from going through the same optical path as a signal light of recorded information of the optical disk and being incident in the photo-acceptance surface of a photodetector. As a result, an aperture-limiting function with a wavelength selectivity of the annular region ($A_1$) can be substantially obtained.

Figure 14:
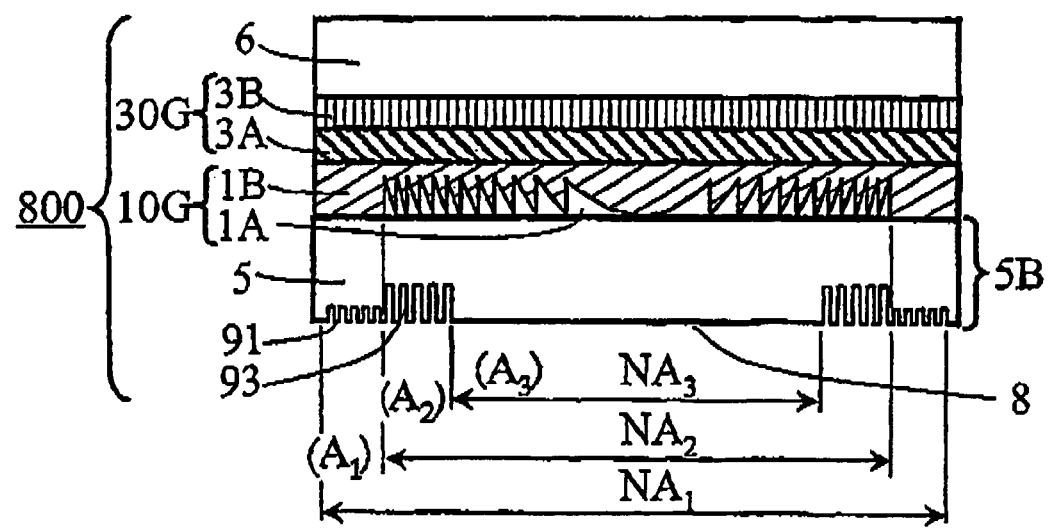
FIG. 14 is a cross-sectional view showing the construction of the phase correction element according to a modified example of the seventh embodiment of the present invention.

Further, FIG. 14 shows a cross-sectional view of a phase correction element 800 according to a modified example of the seventh embodiment, wherein instead of the multi-layer film filter 92 formed in the annular region ($A_2$), an aperture-limiting substrate 5B in which a diffraction grating 93 having a wavelength-selectivity of transmitting light having a wavelength of $\lambda_1$ and that having a wavelength of $\lambda_2$ and diffracting light having a wavelength of $\lambda_3$, is employed.

By forming the diffraction grating 93 having a concavo-convex form in cross-section with a ratio between the lengths of the concave portion and the convex portion of 1:1 and the function for generating a wavelength phase difference of about 5 times of the wavelength $\lambda_1$, the wavelength phase difference becomes about 3 times of wavelength $\lambda_2$ and about 2.5 times of wavelength $\lambda_3$, whereby an aperture-limiting function by which incident light having a wavelength of $\lambda_1$ and incident light having a wavelength $\lambda_2$ are straightly transmitted and incident light having a wavelength of $\lambda_3$ is diffracted so that at most 30% of the light is transmitted straightly is provided.

The same wavelength-selection function is exhibited if the wavelength phase difference between the concave portion and the convex portion is substantially an integer number times of wavelength $\lambda_1$ and wavelength $\lambda_2$ and non-integer times, preferably a value close to an odd number times of ½, of wavelength $\lambda_3$.

A wavefront aberration is not generated if the phase differences of transmitted light having a wavelength of $\lambda_1$ and that having a wavelength $\lambda_2$ between the convex portion of the diffraction grating 93 and the circular region ($A_3$), are integer number times of wavelength $\lambda_1$ and wavelength $\lambda_2$ respectively. As shown in FIG. 14, by directly processing the surface of the transparent substrate 5 to form the diffraction grating 91 in the annular region ($A_1$) and the diffraction grating 93 in the annular region ($A_2$) so that the surfaces of the convex portions of the grating are in phase, transmitted wavefronts of transmitted light having a wavelength of $\lambda_1$ through the $NA_1$ region in the aperture-limiting substrate 5B and transmitted light having a wavelength of $\lambda_2$ through the $NA_2$ region are not changed, and no wavefront aberration is generated.

The phase correction elements 700 and 800 show cases where two types of aperture-limiting functions having different wavelength-selectivity are formed in the annular region ($A_1$) and the annular region ($A_2$) respectively. However, in a case where the first phase correction layer has a function of limiting the numerical aperture to be $NA_2$ for a light having a wavelength of $\lambda_2$, the multi-layer film filter 92 or the diffraction grating 93 is formed only in the annular region ($A_2$) or both in the annular region ($A_1$) and the annular region ($A_2$) Further, an example where an aperture-limiting means is formed on the surface of the transparent substrate 5, has been shown. However, it may be formed on the surface of the transparent substrate 6 or in the phase correction element.

In the phase correction element 700, an aperture-limiting function can be obtained by forming a rectangular diffraction grating having a rectangular shape in cross section and having a fine diffraction pitch, that is made of the same transparent material 1A as that of the first phase correction layer 10B formed in the region of numerical aperture $NA_2$ for the circular region ($NA_1$), to diffract incident light having a wavelength of $\lambda_2$ and incident light having a wavelength of $\lambda_3$. In this case, the height of the convex portion of the rectangular diffraction grating has to be made about a half of that of the transparent material 1A of the saw-tooth-like grating of the phase correction layer 10B.

Further, in the phase correction elements 300 and 500, an aperture-limiting function can be obtained by forming a rectangular diffraction grating having a rectangular shape in cross section, having a fine diffraction pitch and having a small grating pitch in the same manner as the first phase correction layers 10C and 10E formed in the region of numerical aperture $NA_2$, also in the annular region ($A_1$) on the surface of the transparent substrate 5, to diffract incident light having a wavelength of $\lambda_2$ and incident light having a wavelength of $\lambda_3$. In this case, the height of the convex portion of the rect-angular diffraction grating has to be the height $d_{N1}$ of one step of the phase correction layers 10C and 10E as step-like gratings.

Further, in the phase correction element 500, an aperture-limiting function can be obtained by forming a rectangular diffraction grating having a rectangular shape in cross section and fine grating pitch, made of the same high-molecular liquid crystal as the second phase correction layer 20E formed in the region of numerical aperture $NA_3$, also in the annular region ($A_1$) and the annular region ($A_2$), to diffract an extraordinarily polarized incident light having a wavelength of $\lambda_3$. In this case, the height of the convex portion of the rectangular diffraction grating have to be the height $d_{M1}$ of one step of the phase correction layer 20E as a step-like grating.

EIGHTH EMBODIMENT

An example of the optical head device provided with the phase correction element according to the present invention obtained from the first to seventh embodiments, will be described using FIGS. 15 to 18.

Figure 15:
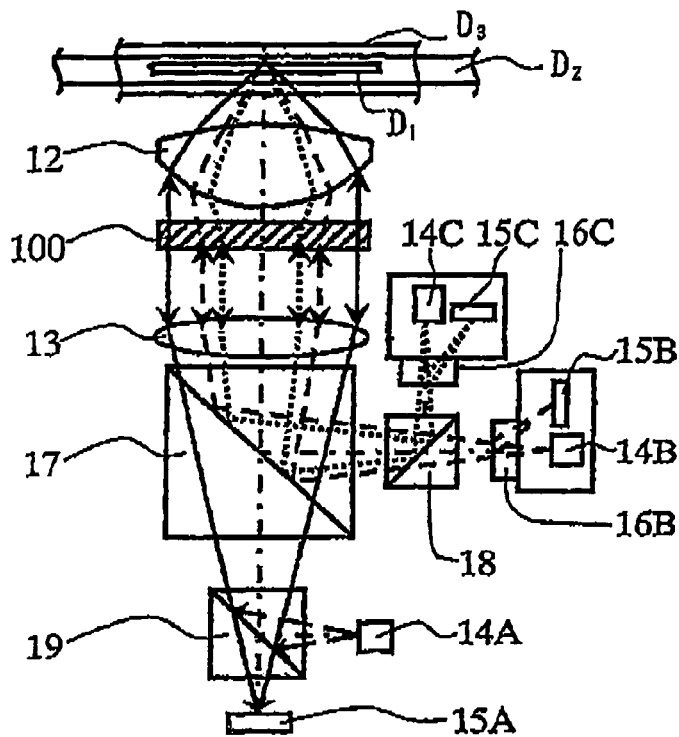
FIG. 15 is a constructual view showing the optical head device having the phase correction element according to the eighth embodiment.

FIG. 15 is a construction view showing an optical head device provided with the first phase correction element 100 according to the first embodiment. Here, the phase correction element 100 is not limited to the above-mentioned first phase correction element 100, but may be any one of the first to seventh phase correction elements.

Figures 16A, 16B, 16C:
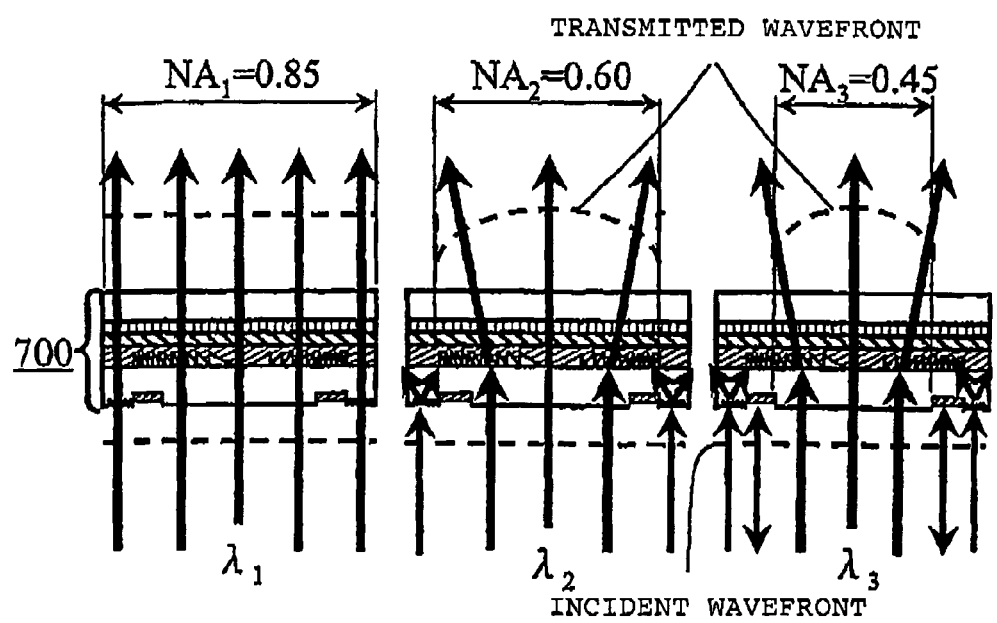

Further, in FIGS. 16 to 18, (a), (b) and (c) are cross-sectional views showing light beams and wavefronts when three types of light having wavelengths of $\lambda_1$, $\lambda_2$ and $\lambda_3$ are incident into the phase correction element respectively. FIG. 16 shows a case of the seventh phase correction element 700, FIG. 17 shows a case of the fifth phase correction element 500 and FIG. 18 shows a case of a phase correction element 900 which is the sixth phase correction element 600 in which a multi-layer film filter (not shown) is formed in the annular region ($A_1$) and the annular region ($A_2$) to transmit light having a wavelength of $\lambda_1$ and light having a wavelength of $\lambda_2$ and to reflect light having a wavelength of $\lambda_3$.

The optical head device is provided with a semiconductor laser 14A emitting a light in a $\lambda_1$=410 nm wavelength band used for an optical disk for HD, a semiconductor laser 14B generating a light in a $\lambda_2$=650 nm wavelength band to be used for an optical disk for DVD, and a semiconductor laser 14C generating a light in a $\lambda_3$=780 nm wavelength band to be used for an optical disk for CD, and provided with a photodetector 15A receiving light having a wavelength of $\lambda_1$, a photodetector 15B receiving light having a wavelength of $\lambda_2$, and an photodetector 15C receiving light having a wavelength of $\lambda_3$.

Further, in this optical head device, a polarizing beam splitter 19, a light-combiner prism 17, a collimator lens 13, the above-mentioned phase correction element 100 and an objective lens 12 are disposed in the optical path of light having a wavelength of $\lambda_1$.

Further, in this optical head device, a hologram beam splitter 16B and a light-combiner prism 18 are disposed in the optical path of light having a wavelength of $\lambda_2$ to lead the light to the light-combiner prism 17, and a hologram beam splitter 16C is disposed in the optical path of light having a wavelength of $\lambda_3$ to lead the light to the light-combiner prism 18.

(I) In the above construction, the light having a wavelength of $\lambda_1$ emitted from the semiconductor laser 14A is reflected by the polarizing beam splitter 19, transmitted through the light-combiner prism 17, and turned in a parallel light by the collimator lens 13 and incident in the phase correction element 100 as an ordinarily polarized light. Further, it is transformed into a circularly polarized light by the first phase plate in the phase correction element 100 functioning as a ¼ phase plate to light having a wavelength of $\lambda_1$, and straightly transmitted through the phase correction element 100 as shown in (a) of FIGS. 16 to 18. Then, light beam corresponding to a numerical aperture $NA_1=0.85$ is converged on an information recording medium of an optical disk $D_1$ (an optical disk for HD) by the objective lens 12 designed so as to correspond to the optical disk $D_1$ for HD.

A signal light having a wavelength of $\lambda_1$ reflected by the information recording plane of the optical disk $D_1$, goes back through the incoming path and transformed into extraordinarily polarized light by the first phase plate in the phase correction element 100, straightly transmitted through the phase correction element 100, transmitted through the light-combiner prism 17 and the polarizing beam splitter 19 and effectively converged on a photo-receiving surface of the photodetector 15A to be transformed into an electrical signal.

(II) Further, at least a half of light having a wavelength of $\lambda_2$ emitted from the semiconductor laser 14B, is transmitted through the hologram beam splitter 16B, transmitted through the light-combiner prism 18, reflected by the light-combiner prism 17 and converged by a collimator lens 13 to be a parallel light and incident in the phase correction element 100. Further, in the phase correction element 100, the transmitted wavefront of the light beam corresponding to a numerical aperture $NA_2=0.60$ is transformed as shown in (b) of FIGS. 16 to 18 by the first phase correction layer in the phase correction element 100 so that the wavefront aberration caused by the difference of cover thickness of optical disks is corrected and the power corresponding to the concave lens is imparted. Then, the light beam transmitted through the phase correction element 100 is converged on an information recording plane of an optical disk $D_2$ (in this case, an optical disk for DVD) by the objective lens 12.

Signal light having a wavelength of $\lambda_2$ reflected by the information recording plane of the optical disk $D_2$, goes back through the incoming path, a part of the signal light is diffracted by the hologram beam splitter 16B, and converged on an photo-acceptance surface of the photodetector 15B, and transformed into an electric signal.

(III) Further, with respect to the light having a wavelength of $\lambda_3$ emitted from the semiconductor laser 14C, at least a half of the light is transmitted through the hologram beam splitter 16C, reflected by the light-combiner prism 18 and the light-combiner prism 17, and converged by a collimator lens 13 to be substantially parallel light and incident into the phase correction element 100. Further, the transmitted wavefront of the light beam corresponding to a numerical aperture $NA_3=0.45$ in the phase correction element 100, is transformed as shown in (c) of FIGS. 16 to 18 by the first or second phase correction layer in the phase correction element so as to correct the wavefront aberration caused by the difference of cover thicknesses of optical disks and to impart the power corresponding to the concave lens. Then, the light beam transmitted through the phase correction element 100 are converged on the information recording plane of an optical disk $D_3$ (in this case, an optical disk for CD) by the objective lens 12.

Signal light having a wavelength of $\lambda_3$ reflected by the information recording plane of the optical disk $D_3$, goes back through the incoming path and a part of the light is diffracted by the hologram beam splitter 16C, and converged on an photo-receiving surface of the photodetector 15C to be transformed into an electrical signal.

In the phase correction element 700 shown in FIG. 11, since a first phase correction layer 10G having no polarization dependency is used, aberration correction can be performed regardless of the polarization state of incident light having a wavelength of $\lambda_2$. Further, by employing a first phase plate 30D (refer to FIG. 6) functioning as a ¼ waveplate for three types of incident light having a wavelength of $\lambda_1$, a wavelength of $\lambda_2$ and a wavelength of $\lambda_3$ respectively, it is possible to transform light coming and returning in the phase plate into linearly polarized light having a polarization plane perpendicular to that of the incident light.

Further, by employing a polarizing hologram beam splitter transmitting ordinarily polarized light and diffracting extraordinarily polarized light as the hologram beam splitter 16B or 16C, light utilization efficiency can be improved. Or, since light having the same polarization plane as that of the emitted light, does not return to the emission point of the semiconductor laser, the laser emission is stabilized and recording and/or reproducing can be performed with high reliability.

In the phase correction element 500 shown in FIG. 7, when the light having a wavelength of $\lambda_2$ is made an ordinarily polarized light in the incoming and returning paths, the correction of the wavefront aberration of an incident light having a wavelength of $\lambda_2$ can be achieved by the first phase correction layer 10E.

Further, in the phase correction element 900 shown in FIG. 18, when the light having a wavelength of $\lambda_2$ is made to be extraordinarily polarized light in the incoming and returning paths, the correction of the wavefront aberration of incident light having a wavelength of $\lambda_2$ can be achieved by the second polarizing phase correction layer 10F$_2$ (refer to FIG. 10).

In the phase correction element 500 shown in FIG. 7, when the light having a wavelength of $\lambda_3$ is made to be an extraordinarily polarized light in the incoming and returning paths, the correction of the wavefront aberration of an incident light having a wavelength of $\lambda_3$ can be achieved by the second phase correction layer 20E.

Further, in the phase correction element 700 shown in FIG. 11 and in the phase correction element 900 shown in FIG. 18, an aberration correction function is generated also for an incident light having a wavelength of $\lambda_3$ by the first phase correction layer 10G or the second polarization phase correction layer 10F$_2$ (refer to FIG. 10) in the incoming and returning paths. However, since a spherical aberration remains, a good wavefront aberration correction can be performed by making the incident light having a wavelength of $\lambda_3$ to be a slight divergent light with respect to the phase correction element and the objective lens. Or, by making the incident light having a wavelength of $\lambda_2$ and incident light having a wavelength of $\lambda_3$ to have the same degree of divergence with respect to the phase correction element and the objective lens, the phase correction layer can formed so that a wavefront aberration correction can be performed to lights of both wavelengths. Here, in the phase correction element 900, the incident light of wavelength of $\lambda_3$ is made to be the same extraordinarily polarized light as the incident light of wavelength of $\lambda_2$, so that its aberration is corrected by the second polarization phase correction layer 10F$_2$.

Further, in a case where an objective lens designed to be adapted for an optical disk for HD in a $\lambda_1=410$ nm wavelength band and having a cover thickness of 0.1 mm, is used for optical disks for DVD and CD, in order to maintain the distance between the objective lens and the optical disks, it is preferred that the phase correction layer has a grating pattern which produces a transmitted wavefront having a power component functioning as a concave lens in addition to a spherical aberration correction component.

Here, the phase correction element 700 shown in FIG. 11 shows a case where the diffraction grating 91 limits incident light having a wavelength of $\lambda_2$ within a numerical aperture of $NA_2=0.60$, and the diffraction grating 91 and the multi-layer film filter 92 limit incident light having a wavelength of $\lambda_3$ within a numerical aperture of $NA_3=0.45$.

Further, the phase correction element 500 shown in FIG. 7 shows a case where the first phase correction layer 10E limits incident light having a wavelength of $\lambda_2$ within a numerical aperture of $NA_2=0.60$, and the second phase correction layer 20E limits incident light having a wavelength of $\lambda_3$ within a numerical aperture of $NA_3=0.45$.

On the other hand, the phase correction element 900 shown in FIG. 18 shows a case where the second polarization phase correction layer 10F$_2$ (refer to FIG. 10) limits the incident light having a wavelength of $\lambda_2$ within a numerical aperture of $NA_2=0.60$, and the multi-layer film filter 92 (refer to FIG. 11, here, it is formed in the annular regions (A$_1$) and (A$_2$)) limits the incident light having a wavelength of $\lambda_3$ within a numerical aperture of $NA_3=0.45$.

Therefore, by employing any one of the first to eighth phase correction elements shown in the embodiments of the present invention, a wavefront aberration generated when the objective lens 12 designed for an optical disk for HD having a cover thickness of 0.1 mm, is used for recording and/or reproducing an information in an optical disk for DVD having a cover thickness of 0.6 mm or in an optical disk for CD having a cover thickness of 1.2 mm, can be corrected. Therefore, it is possible to stably converge light transmitted from a semiconductor laser to an information recording plane of an optical disk, and to achieve recording and/or reproducing an information in three types of optical disks of HD, DVD and CD.

Further, as shown in FIGS. 16 to 18, by forming the phase correction layer so that light having a wavelength of $\lambda_2$ and light having a wavelength of $\lambda_3$ are each converted to be divergent light after they are transmitted through the phase correction element, the distance (working distance) between the objective lens 12 and optical disks D$_2$ and D$_3$ for DVD and CD can be extended as shown by the dotted lines for the optical path in FIG. 15. By making the working distance large, the stability when the objective lens 12 and the phase correction element (100 to 900) are provided on an actuator (not shown) and the focus servo is actuated, is improved.

Here, in the above-mentioned embodiment, the objective lens 12 for HD designed to have a numerical aperture $NA_1=0.85$ corresponding to an optical disk D$_1$ for HD in a $\lambda_1=410$ nm wavelength band having a cover thickness of 0.1 mm is assumed, it is also possible to provide a phase correction element necessary for recording and/or reproducing information in an optical disk D$_2$ for DVD and an optical disk D$_3$ for CD, employing an objective lens designed to have a numerical aperture of about $NA_1=0.65$ corresponding to an optical disk D$_1$ for HD having a cover thickness of 0.6 mm.

In this case, since the optical disks D1 and D2 for HD and DVD respectively have about the same cover thickness, and objective lenses for these disks have about the same numerical aperture, a spherical aberration generated by a refractive index wavelength dispersion of the optical material (particularly for the objective lens) caused by the difference of wavelength to be used, can be corrected. Further, by making the numerical apertures NA$_1$ and NA$_2$ for a $\lambda_1=410$ nm wavelength band and a $\lambda_2=650$ nm wavelength band, respectively, to be about the same, the aperture-limiting function can be provided by any one of the multi-layer film filter 92 or the diffraction grating 93 which transmits light having a wavelength of $\lambda_1$ and light having a wavelength of $\lambda_2$ and does not transmits light in a $\lambda_3=780$ nm wavelength band.

Further, since the numerical aperture for HD is about the same as the numerical aperture for DVD, it is not necessary to extend the distance between the objective lens and optical disks for DVD and CD. Therefore, the phase correction element does not need to have function as a concave lens producing a transmitted wavefront having a large power component, and only the spherical aberration component be converted.

In a case of correcting a spherical aberration generated when the objective lens for HD having numerical aperture of about $NA_1=0.65$ is used for an optical disk D$_2$ for DVD with a wavelength of $\lambda_2$ and a numerical aperture NA$_2$, by the phase correction element, the phase correction layer to be fabricated is the same as the first phase correction layer 10C employed in the third phase correction element 300 shown in FIG. 4.

The phase correction element 300 has a Fresnel lens form constituted by a blazed diffraction grating having a multi-step form in cross section in order to correct a spherical aberration containing a large power component shown in (B) of FIG. 3. However, also in a case where the wavefront aberration to be corrected is a spherical aberration and the size is within one wavelength, the multi-step-like pattern has to be determined by the wavefront aberration correction method shown in FIG. 5.

Here, in a case of correcting a spherical aberration by a step-like pattern, a high-order aberration component remains in the transmitted wavefront. Such high-order aberration can be reduced by processing the refractive index wavelength dispersion material constituting the first phase correction layer 10B employed in the second phase correction element 200 (refer to FIG. 1) to have a shape by which the high-order wavefront aberration can be corrected, and by using the first phase correction layer 10C (refer to FIG. 4) in combination with it. Further, such high-order aberration can be reduced by processing the high-molecular liquid crystal constituting the polarizing phase correction layer employed in the sixth phase correction element 600 shown in FIG. 10, to have a shape by which the high-order wavefront aberration can be corrected, and by using the first phase correction layer 10C in combination with it.

The method for correcting a spherical aberration generated when the objective lens for HD having a numerical aperture of about $NA_1=0.65$, is used for an optical disk D$_3$ for CD with a wavelength of $\lambda_3$ and a numerical aperture of NA$_3$, may be a method for reforming incident light into divergent light to the objective lens or a method for employing the same phase correction layer as the second phase correction layer 20E employed in the fifth phase correction element 500 shown in FIG. 7. Here, as aperture limitation for limiting light beams having a wavelength of $\lambda_3$ to have a numerical aperture of NA$_3$, a multi-layer film filter 92 employed in the seventh phase correction element 700 shown in FIG. 11 or the diffraction grating 93 employed in the eighth phase correction element 800 shown in FIG. 14, should be formed in an outer area of the numerical aperture NA$_3$.

Now, Examples will be described.

EXAMPLE 1

An example of the seventh phase correction element 700 according to the present invention will be described using FIG. 11 (cross-sectional view) and FIG. 12 (plan view).

In order to produce the seventh phase correction element 700:

(1) First of all, a diffraction grating 91 having a concavo-convex portion in cross section in which the depth of is 862 nm and the ratio in length of a concave portion to a convex portion is 1:1, and having a linear plan shape, is formed in an annular region ($A_1$) obtained by subtracting a circular region of numerical aperture $NA_2$=0.60 from a circular region of numerical aperture $NA_1$=0.85 of a surface of a glass substrate (transparent substrate) having a refractive index=1.47 by etching process to form two divided patterns symmetrical to each other with respect to Y axis, the patterns being inclined at an angle of ±45° to Y axis.

(2) Then, a four-layered antireflective film 8 (refer to FIG. 13) made of $SiO_2$ and $TiO_2$ as an antireflective film 8 for three types of light in a $\lambda_1$=410 nm wavelength band, in a $\lambda_2$=650 nm wavelength band and a $\lambda_3$=780 nm wavelength band respectively, is deposited in the entire area of the surface on which the diffraction grating 91 is formed. The construction is shown in Table 1. In this case, the optical path length (refractive index×film thickness) of the antireflective film 8 is 331 nm at a wavelength of $\lambda_1$ and 322 nm at a wavelength of $\lambda_2$.

TABLE 1

| Layer | Material | Refractive index (wavelength) | | Film thickness |
|---|---|---|---|---|
| | | (405 nm) | (660 nm) | |
| Ambience | Air | 1.0 | 1.0 | |
| 1 | $SiO_2$ | 1.470 | 1.456 | 123.9 nm |
| 2 | $TiO_2$ | 2.530 | 2.271 | 11.4 nm |
| 3 | $SiO_2$ | 1.470 | 1.456 | 57.8 nm |
| 4 | $TiO_2$ | 2.530 | 2.271 | 14.0 nm |
| Substrate | Quartz | 1.470 | 1.456 | |

TABLE 2

| Layer | Material | Refractive index (wavelength) | | Film thickness |
|---|---|---|---|---|
| | | (405 nm) | (660 nm) | |
| Ambience | Air | 1.0 | 1.0 | |
| 1 | $SiO_2$ | 1.470 | 1.456 | 73.1 nm |
| 2 | $Ta_2O_5$ | 2.195 | 2.131 | 103.3 nm |
| 3 | $SiO_2$ | 1.470 | 1.456 | 121.3 nm |
| 4 | $Ta_2O_5$ | 2.195 | 2.131 | 89.5 nm |
| 5 | $SiO_2$ | 1.470 | 1.456 | 162.6 nm |
| 6 | $Ta_2O_5$ | 2.195 | 2.131 | 98.8 nm |
| 7 | $SiO_2$ | 1.470 | 1.456 | 123.9 nm |
| 8 | $Ta_2O_5$ | 2.195 | 2.131 | 89.4 nm |
| 9 | $SiO_2$ | 1.470 | 1.456 | 141.8 nm |
| 10 | $Ta_2O_5$ | 2.195 | 2.131 | 94.0 nm |
| 11 | $SiO_2$ | 1.470 | 1.456 | 169.2 nm |
| 12 | $Ta_2O_5$ | 2.195 | 2.131 | 97.5 nm |
| Substrate | Quartz | 1.470 | 1.456 | |

(3) Then, a transparent dielectric film $Ta_2O_5$ having a high refractive index and a transparent dielectric film $SiO_2$ having a low refractive index are laminated alternately to form a 12-layer lamination in an annular region ($A_2$) obtained by subtracting a circular region of numerical aperture $NA_3$ from a circular region of numerical aperture $NA_2$=0.6 in the surface of the glass substrate 5 (transparent substrate 5), to form a multi-layer film filter 92 transmitting at least 90% of light having a wavelength of $\lambda_1$ and light having a wavelength of $\lambda_2$ and reflecting at least 70% of light having a wavelength of $\lambda_3$. The construction is shown in Table 2. Here, the total film thickness $d_2$ of the multi-layer film filter 92 is 1,364 nm, the optical path length is 2,420 nm at a wavelength of $\lambda_1$ and 2,373 nm at a wavelength of $\lambda_2$.

When such multi-layer film filter 92 is formed in the annular region ($A_2$) of the glass substrate 5, the annular region ($A_2$) of the glass substrate 5 is subjected to an etching process to form a step for phase adjustment in advance before depositing the multi-layer film filter 92 so as not to generate a phase difference with respect to the circular region ($A_3$). Specifically, the glass substrate 5 is processed to have a depth of 2,187 nm with respect to the surface S3 of the circular region ($A_3$) of FIG. 13 including the thickness 207 nm of the antireflective film 8.

Here, the optical path length ($L_3$) between $S_0$ surface and $S_3$ surface in the circular region ($A_3$) for incident light having a wavelength of $\lambda_3$, is represented by the formula (3), and is the sum of the optical path length of the glass substrate 5 after the etching process and the antireflective film 8, which is $L_3$=3,242 nm.

On the other hand, the optical path length ($L_2$) between $S_0$ surface and $S_3$ surface in the annular region ($A_2$), is calculated by formula 2, and is the sum of the optical path length 2,420 nm (=1.774×1,364 nm) of the multi-layer film filter 92 and the optical path length 823 nm of air layer between $S_2$ surface and $S_3$ surface generated in the space to the circular region ($A_3$), which is $L_2$=3,243 nm and approximately $L_2$=$L_3$. Therefore, no phase difference is generated in the annular region ($A_1$) of the aperture-limiting substrate 5A and the circular region ($A_3$) for incident light having a wavelength of $\lambda_1$. Accordingly, the same transmitted wavefront as that of the incident light is obtained in the entire region of aperture $NA_1$.

Further, also, for incident light having a wavelength of $\lambda_2$, the optical path length $L_3$ between $S_0$ surface and $S_3$ surface in the circular region ($A_3$) is $L_3$=3,197 nm, and the optical path length $L_2$ between $S_0$ surface and $S_3$ surface in the circular region ($A_2$) is $L_2$=3,205 nm, and approximately $L_2$=$L_3$. Therefore, also for incident light having a wavelength of $\lambda_2$, the same transmitted wavelength as that of the incident light can be obtained in the entire region of numerical aperture $NA_2$ of the aperture-limiting substrate 5A.

Figure 19:
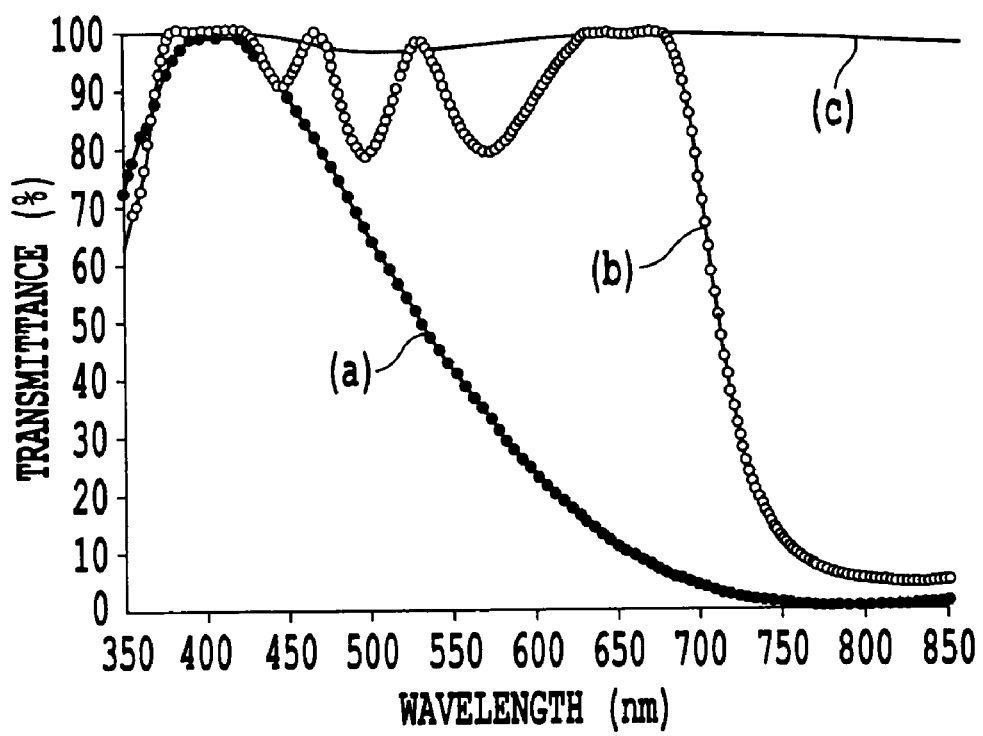
FIG. 19 is a graph showing spectral transmittances of every region of the aperture-limiting substrate shown in FIG. 12, wherein (a) shows the spectral transmittance of the first annular region ($A_1$), (b) shows the spectral transmittance of the second annular region ($A_2$) and (c) shows the spectral transmittance of the circular region ($A_3$).
Figure 20:
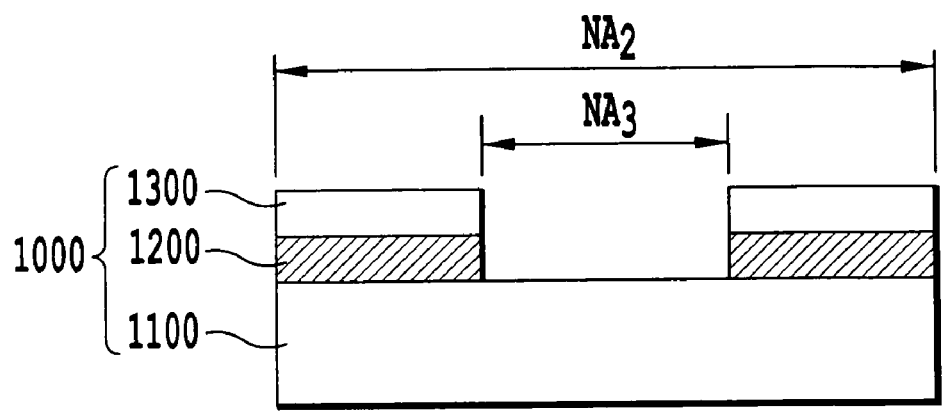
FIG. 20 is a cross-sectional view showing the construction of a conventional aperture-limiting element.

The spectral transmittance of the aperture-limiting substrate 5A of this Example thus obtained is shown in FIG. 19. The spectral transmittance of the diffraction grating 91 formed in the annular region ($A_1$) is shown by a line (a), the spectral transmittance of the multi-layer film filter 92 formed in the circular region ($A_2$) is shown by a line (b), and the spectral transmittance of the antireflective film 8 formed in the circular region ($A_3$) is shown by a line (c).

(4) Then, in the opposite surface of the glass substrate 5 from the surface on which the aperture-limiting function is formed, an SiON film made of a mixed composition of SiN and $SiO_2$ as a transparent material of an optical index $n_A$, is deposited to have a film thickness of 32 μm. Then, it is processed to have a Fresnel lens shape having a saw-tooth-form in cross section as shown in FIG. 11, to make it to be a transparent substrate 1A constituting the first phase correction layer 10G. Further, a high-refractive index transparent plastic material as a transparent material 1B having a refractive index of $n_B$ is filled and solidified in the concave portion to form a first phase correction layer 10G.

Here, the refractive indexes of the transparent material 1A (SiON) and the transparent material 1B (high-refractive index plastic material), are substantially equal to each other at a wavelength of $\lambda_1$, a refractive index difference of 0.020 is generated at a wavelength of $\lambda_2$ and a refractive index difference of 0.023 is generated at a wavelength of $\lambda_3$. Therefore, the first phase correction layer 10G does not change the transmitted wavefront for incident light having a wavelength of $\lambda_1$, but changes wavefronts of incident light having a wavelength of $\lambda_2$ and incident light having a wavelength of $\lambda_3$. Since the step height of the concavo-convex portion having a saw-tooth-form corresponds to the phase difference of about 1 wavelength for a middle wavelength such as the wavelength $\lambda_2$ and the wavelength $\lambda_3$, the first-order diffraction light is maximized at the wavelength $\lambda_2$ and the wavelength of $\lambda_3$.

Here, in the first phase correction layer 10G, the transparent material 1A has a larger refractive index than the transparent material 1B at the wavelength $\lambda_2$ and the wavelength $\lambda_3$, the first phase correction layer 10G has the cross-sectional shape as shown in FIG. 11.

(5) Then, after coating on one side of the glass substrate 6 with polyimide and applying a alignment treatment in a direction at an angle of 163° to X axis, the glass substrate 6 is further coated with a solution of an acrylic type liquid crystal monomer, irradiated with an ultraviolet light to polymerize and cure the liquid crystal monomer to form a phase plate 3B comprising a high-molecular liquid crystal film of a birefringent material having a fast axis aligned to be at an angle of 73° to X axis. Here, the retardation value of the phase plate 3B at a wavelength of 520 nm corresponding to the middle wavelength between the wavelength $\lambda_2$ and the wavelength $\lambda_3$, is 130 nm which corresponds to about ¼ wavelength. Here, with respect to the angle, the positive angle indicates an angle in counterclockwise direction in FIG. 12.

Further, by employing an organic thin film made of polycarbonate exhibiting birefringency by drawing, for the phase plate 3A, it is laminated on the phase plate 3B using an adhesive, and is bonded and fixed to the phase correction layer 1. The retardation value of the phase plate 3A at a wavelength of 520 nm is 260 nm which corresponds to about ½ wavelength, and the fast axis extends in a direction at an angle of 17° to X axis. Namely, the fast axes of the phase plate 3A and the phase plate 3B are at an angle of 56° to each other.

Thus, the first phase plate 30G is produced by laminating the phase plate 3A and the phase plate 3B.

According to the seventh phase correction element 700 thus produced, when three types of light of wavelengths of $\lambda_1$, $\lambda_2$ and $\lambda_3$ respectively, having polarization planes in the X axis direction, are incident into the first phase plate 30G from the side of the aperture-limiting substrate 5A, every light is turned into circularly polarized light having a ellipticity κ of at least 0.9 to be emitted, whereby the function corresponding to a ¼ waveplate can be obtained for these three wavelengths.

EXAMPLE 2

Next, an example of the fifth phase correction element 500 according to the present invention will be described using FIG. 7 (cross-sectional view) and FIG. 8 (plan view).

(1) Etching is carried out directly to an area of numerical aperture $NA_2$=0.60 in the surface of a glass substrate 5 (transparent substrate) having refractive indexes at three wavelengths $\lambda_1$=405 nm, $\lambda_2$=655 nm and $\lambda_3$=790 nm of 1.470, 1.456 and 1.454 respectively, to form a first phase correction layer 10E comprising a step-like blazed diffraction grating having an orbicular zone-shaped concavo-convex shape (a Fresnel lens shape) with a rotational symmetry with respect to the optical axis, the cross-sectional shape of the grating being in a saw-tooth-form approximated by five levels (four steps) of step.

Here, the height $d_{N1}$ of one step of the step-like grating is 1.723 μm so that an optical path difference of 2×$\lambda_1$ from the air is produced at a wavelength of $\lambda_1$. Here, the optical path difference is 1.2×$\lambda_2$, namely it corresponds to 0.2×$\lambda_2$, at a wavelength of $\lambda_2$, and the optical path difference is about $\lambda_3$ at a wavelength of $\lambda_3$. Namely, the transmitted wavefronts of light having a wavelength of $\lambda_1$ and light having a wavelength of $\lambda_3$ incident into the 5-level (4 steps) step-like grating, are not changed. However, the transmitted wavefront of a light having a wavelength of $\lambda_2$ is changed by the orbicular zone distribution of the step-like grating.

The radius of each orbicular zone of step-like grating is determined so that a transmitted wavefront aberration generated when an objective lens for HD of $NA_1$=0.85 designed to have good aberration for an optical disk for HD having a cover thickness of 0.1 mm at a wavelength of $\lambda_1$, is used for an optical disk for DVD having a cover thickness of 0.6 mm at a wavelength of $\lambda_2$ with $NA_2$=0.60, can be corrected.

(2) On the opposite surface of the glass substrate 5 from the surface on which the first phase correction layer 10E is formed, a polymer liquid crystal layer having an ordinary refractive index of $n_o$ and an extraordinary refractive index of $n_e$ having the fast axis aligned to X axis, is formed by the same process as that of phase plate 3B of Example 1. Further, a blazed diffraction grating 2A having an orbicular-zone-shaped concavo-convex form (Fresnel lens form) having a rotational symmetry with respect to the optical axis, the cross-sectional shape of the grating of saw-tooth-form being approximated by 3-levels (2 steps) of step, is formed in a region of numerical aperture $NA_3$=0.45 by a photolithography process and a reactive ion etching process, followed by filling the concave portions with a homogeneous refractive index transparent material 2B having a refractive index of $n_s$ which is approximately equal to the ordinary refractive index $n_o$, whereby the second phase correction layer 20E is formed.

Here, the refractive index difference ($n_e$–$n_s$) at the wavelengths $\lambda_1$, $\lambda_2$ and $\lambda_3$ are 0.277, 0.213 and 0.200 respectively, and the height $d_{M1}$ of one step of the step-like grating is made to be 1.462 μm. In this case, the optical path difference in one step of the step-like blazed diffraction grating 2A made of the high-molecular liquid crystal layer from the homogeneous refractive index transparent material 2B for an extraordinarily polarized light, becomes $\lambda_1$ at a wavelength of $\lambda_1$ and 0.37×$\lambda_3$ at a wavelength of $\lambda_3$. Therefore, the transmitted wavefront of ordinarily polarized light incident into the second phase correction layer 20E is not changed regardless of the wavelength, and the transmitted wavefront having a wavelength of $\lambda_1$ is not changed regardless of the incident polarization. On the other hand, the transmitted wavefront of extraordinarily polarized incident light having a wavelength of $\lambda_3$ is changed according to a distribution of the orbicular zone of the step-like grating.

The radius of each orbicular zone of step-like grating is determined so that the transmitted wavefront aberration generated when the objective lens is used for an optical disk for CD having a cover thickness of 1.2 mm at a wavelength of $\lambda_3$ with $NA_3$=0.45, is corrected.

(3) Then, a phase plate 3D comprising a high-molecular liquid crystal film having a fast axis aligned in X direction, is formed in the same manner as the phase plate 3B in Example 1 on one side of the glass substrate 6. Here, the retardation value of the phase plate 3D for light having a wavelength of $\lambda_1$, is 203 nm which corresponds to about ½ wavelength. Further, in the same manner as the phase plate 3A of Example 1, a thin organic film made of polycarbonate is employed for the phase plate 3C, and it is laminated on the phase plate 3D using an adhesive, and is bonded and fixed to the phase correction layer 20E. The retardation value of the phase plate 3C at a wavelength of $\lambda_1$ is 102 nm which corresponds to about ¼ wavelength, and the fast axis is at an angle of 45° to X axis. In this manner, a first phase plate 30E having the phase plate 3C and the phase plate 3D laminated, is produced.

According to the fifth phase correction element 500 thus produced, when light having a wavelength of $\lambda_1$ having a polarization plane in X axis direction, is incident from the side of the transparent substrate 5, it is transformed into circularly polarized light having a ellipticity K of at least 0.9 and then the light is emitted, whereby a function corresponding to that of ¼ waveplate can be obtained. Further, when light having a wavelength of $\lambda_2$ and light having a wavelength of $\lambda_3$ having polarization planes in Y axis direction, are incident, they are each transformed into linearly polarized light having a polarized plane rotated, whereby a function corresponding to a ½ phase plate can be obtained.

Therefore, when ordinarily polarized incident light having a wavelength of $\lambda_2$ come and returns through the first phase plate 30E, it becomes the original ordinarily polarized light, and is straightly transmitted through the second phase correction layer 20E without changing the transmitted wavefront in the returning path. Further, when extraordinarily polarized incident light having a wavelength of $\lambda_3$ come and returns through the first phase plate 30E, it becomes the original extraordinarily polarized light, and the transmitted wavefront is changed by the second phase correction layer 20E in the returning path. Thus, a wavefront aberration correction function is exhibited.

Here, since ordinarily polarized light in the region of $NA_2$ having a wavelength of $\lambda_2$ transmitted through the first phase correction layer 10E, and extraordinarily polarized light in the region of $NA_3$ having a wavelength of $\lambda_3$ transmitted through the second phase correction layer 20E, have transmitted wavefronts containing power components, their focal planes are different from that of transmitted light other than the predetermined numerical aperture regions. Therefore, there is no need to provide an aperture-limiting function in the area outside the numerical aperture regions.

EXAMPLE 3

An example of the sixth phase correction element 600 according to the present invention will be described using FIG. 10 (cross-sectional view).

(1) In an annular region ($A_1$) and an annular region ($A_2$) of a glass substrate 51 (transparent substrate), a multi-layer film filter (not shown) which is the same as the multi-layer film filter 92 of Example 1, is formed.

Further, a first phase plate 30F formed by laminating the phase plate 3D and the phase plate 3C on one side of the glass substrate 6 (transparent substrate), is the same as the first phase plate 30E (FIG. 7) employed in Example 2. Therefore, its description is omitted.

(2) On one side of a glass substrate 52, a phase plate 3F comprising a high-molecular liquid crystal film having a fast axis aligned at an angle of 70° to X axis, is formed by the same method as the phase plate 3B in Example 1. Here, the retardation value of the phase plate 3F for a light having a wavelength of $\lambda_1$ is 405 nm which corresponds to about one wavelength. Further, in the same manner as the phase plate 3A in Example 1, an organic thin film made of polycarbonate as the phase plate 3E is used and, it is laminated on the phase plate 3F employing a homogeneous refractive index transparent material 1G as an adhesive, and concave portions of the blazed diffraction grating 1F made of a high-molecular liquid crystal of the second polarizing phase correction layer $10F_2$ are filled with the homogeneous refractive index transparent material 1G, to bond and fix the phase plate 3E.

The retardation value of the phase plate 3E at a wavelength of $\lambda_1$ is 405 nm which corresponds to about one wavelength, and its fast axis is made in a direction at an angle of 25° to X axis. Namely, the fast axes of the phase plate 3E and the phase plate 3F are at an angle of 45° to each other. The second phase plate 40F comprising the phase plate 3E and the phase plate 3F laminated, is produced in this manner. When light having a wavelength of $\lambda_1$ having a polarization plane in X direction, is incident into the second phase plate 40F, the polarization of emitted light is not changed. Further, when light having a wavelength of $\lambda_2$ and light having a wavelength of $\lambda_3$ each having a polarization plane in X axis direction, are incident, they are each transformed into linearly polarized light having a polarization plane rotated by about 90°, whereby a function corresponding to a ½ waveplate can be obtained.

The second polarizing phase correction layer $10F_2$ and the first polarizing phase correction layer $10F_1$ in the sixth phase correction element 600, are high-molecular liquid crystal layers formed on one sides of the glass substrates 51 and 52 and having fast axes aligned in X axis direction, and having an ordinary refractive index of $n_o$=1.55 and an extraordinary refractive index of $n_e$=1.70, these correction layers being formed by the same process as that of the second phase correction layer 20E of Example 2.

(3) Further, blazed diffraction gratings 1F and 1D each having an orbicular-zone-like concavo-convex shape (Fresnel lens shape), having a rotational symmetry with respect to the optical axis and having a saw-tooth-like cross-sectional shape, are formed in a region of numerical aperture $NA_2$=0.60 by a photolithography process and a reactive ion etching processes, and the convex portions are respectively filled with homogeneous refractive index transparent materials 1G and 1E having a refractive index of $n_s$ substantially equal to the ordinary refractive index $n_o$, whereby the second polarizing phase correction layer $10F_2$ and the first polarizing phase correction layer $10F_1$ are formed. Here, as shown in FIG. 10, the blazed diffraction gratings 1F and 1D are processed so that the slopes of the saw-tooth-like cross-sections face opposite directions from each other with respect to the central axis of the concentric circular grating pattern.

When ordinarily polarized light is incident into the saw-tooth formed blazed diffraction gratings 1D and 1F made of a high-molecular liquid crystal, the transmitted wavefront does not change since there is no refractive index difference between the high-molecular liquid crystal and the homogeneous refractive index transparent material. On the other hand, when extraordinarily polarized light is incident, a refractive index difference of about 0.15 is generated between the high-molecular liquid crystal and the homogeneous refractive index transparent material so that a change of transmitted wavefront is occurred according to the shape of the saw-tooth-formed blazed diffraction grating.

In the second phase correction layer 20E of Example 2, a step-like blazed diffraction grating 2A of 3 level (2 steps) is employed. However, the construction of the blazed diffraction gratings 1D or 1F is different from the diffraction grating 2A in that the step height of the saw-tooth-like concavo-convex is the film thickness of the high-molecular liquid crystal corresponding to a phase difference of about 1 wavelength for extraordinary light having a wavelength of $\lambda_2$ and that having a wavelength of $\lambda_3$. As a result, the first-order diffraction light is maximized at the wavelength $\lambda_2$ and the wavelength $\lambda_3$. In this case, the second-order diffraction light is maximized for an extraordinary light having a wavelength of $\lambda_1$.

EXAMPLE 4

The phase correction element, for example, the sixth phase correction element 600 thus produced and the objective lens 12 are integrally formed with an actuator (not shown), and the integrally formed body is mounted on an optical head device shown in FIG. 15.

When the optical head device is employed for recording and/or reproducing optical disks for DVD and CD, a wavefront aberration generated by an objective lens can be corrected, and the distance between the objective lens and the optical disk can be maintained. As a result, the recording and/or reproducing of three types of optical disks for HD, DVD and CD, can be realized stably.

Further, since ordinarily polarized incident light having a wavelength $\lambda_1$ is transformed into extraordinarily polarized outgoing light having a polarization direction perpendicular to the original direction by the phase plate 30F while it come and returns, for example, in the sixth phase correction element 600, a signal light is effectively detected by a photodetector 15A when a polarizing beam splitter 19 is employed in combination.

INDUSTRIAL APPLICABILITY

Since by employing the phase correction element of the present invention, the transmitted wavefront having a wavelength of $\lambda_2$ or a wavelength of $\lambda_3$ can be corrected without changing the transmitted wavefront having a wavelength of $\lambda_1$. Further, since the first phase plate having a function of ¼ waveplate at the wavelength $\lambda_1$, is integrally formed, linearly polarized light having a wavelength of $\lambda_1$ is transformed into perpendicularly linearly polarized light as it come and returns through the phase correction element. As a result, by mounting the phase correction element on an optical head device in combination with an objective lens for HD designed to be optimized for an optical disk for HD at a wavelength of $\lambda_1$, information in optical disks for HD, DVD and CD having different wavelengths to be used and cover thicknesses, can stably be recorded and/or reproduced.

Further, by employing the optical head device of the present invention to which a polarizing beam splitter is provided, light-utilization efficiency of light having a wavelength of $\lambda_1$ is improved in the incoming and returning paths, and the power consumption of a semiconductor laser light source can be reduced and high speed recording and/or reproducing can be achieved. Further, since returning light which may cause unstable emission from the semiconductor laser light source, can be reduced, the emission of the semiconductor laser is stabilized and an optical head device for recording and/or reproducing with high reliability, is realized. Further, since the distance between the objective lens and the optical disk can be maintained, stability of e.g. a focus servo at a time of recording and/or reproducing can be improved. Therefore, an optical head device having an excellent optical characteristic and being suitable for reducing size and weight can be provided.

Further, by employing materials having different refractive index wavelength dispersions are employed for the first phase correction layer in the phase correction element, wavefront aberration correction not relying on the polarization of incident light, can be performed. Further, by processing the first phase correction layer in the phase correction element to be a step-formed grating in which the phase difference of one step correspond to twice of the wavelength $\lambda_1$, the wavefront aberration at a wavelength of $\lambda_2$ can be independently corrected.

Further, by employing a ¼ waveplate for two wavelengths or for three wavelengths, an optical head device for recording and/or reproducing can be easily obtained with high light-utilization efficiency and high reliability at wavelengths for DVD and CD.

Further, by employing a material having different birefringency for the second phase correction layer in the phase correction element; by forming a step-formed grating in which the phase difference of one step corresponds to the wavelength $\lambda_1$ for an extraordinarily polarized light, and by specifying the incident polarization of three wavelengths, the wavefront aberration of the wavelength of $\lambda_3$ can be independently corrected. Further, by constituting a phase correction element of integral structure comprising the first phase correction layer capable of independently correcting the wavefront aberration of the wavelength of $\lambda_2$, and the first phase plate having a function of ¼ waveplate at the wavelength of $\lambda_1$ and having a function of ½ waveplate at the wavelengths of $\lambda_2$ and $\lambda_3$, wavelengths of DVD and CD can independently be corrected.

Further, by employing the first phase plate having a function of ¼ waveplate at the wavelength of $\lambda_1$ and having a function of ½ waveplate at the wavelengths of $\lambda_2$ and the wavelength of $\lambda_3$, the second phase plate having a function of ½ waveplate not rotating the polarization of transmitted light of the wavelength of $\lambda_1$ and rotating the polarization planes of the wavelength of $\lambda_2$ and the wavelength of $\lambda_3$ by 90°, and two polarizing phase correction layers made of a birefringent material and a homogeneous refractive index material, wavefront aberration correction for DVD and CD can be performed. By employing a high-molecular liquid crystal having a large birefringency as a birefringent material, the thickness of the phase correction layer can be reduced and the saw-tooth-like concavo-convex shape can be formed with good accuracy, whereby wavefront aberration correction can be performed with high accuracy and high light-utilization efficiency.

Further, by forming a multi-layer film filter or a diffraction grating straightly transmitting only light having a wavelength of $\lambda_1$ and light having a wavelength of $\lambda_2$ in an annular region obtained by subtracting a region of numerical aperture $NA_3$ from a region of numerical aperture $NA_1$, to perform aperture limitation to light beams for CD having a wavelength of $\lambda_3$, a stable wavefront aberration correction for CD can be performed.

Further, by forming a diffraction grating straightly transmitting only light having a wavelength of $\lambda_1$ in the first annular region obtained by subtracting a region of numerical aperture $NA_2$ from a region of numerical aperture $NA_1$, to be used for an aperture-limiting element for light beams for DVD having a wavelength of $\lambda_2$, a stable wavefront aberration correction for DVD can be performed.

The entire disclosures of Japanese Patent Application No. 2002-223085 filed on Jul. 31, 2002, Japanese Patent Application No. 2002-248835 filed on Aug. 28, 2002, Japanese Patent Application No. 2002-251911 filed on Aug. 29, 2002, Japanese Patent Application No. 2002-295731 filed on Oct. 9, 2002 and Japanese Patent Application No. 2002-372435 filed on Dec. 24, 2002 including specifications, claims, drawings and summaries are incorporated herein by reference in their entireties.

What is claimed is:

1. A phase correction element for transmitting three kinds of light beams having wavelengths $\lambda_1$, $\lambda_2$ and $\lambda_3$ respectively ($\lambda_1 < \lambda_2 < \lambda_3$), which has an area of numerical aperture $NA_2$ and an area of numerical aperture $NA_1$ including the area of numerical aperture $NA_2$ ($NA_1 > NA_2$) in an element plane in which the light is incident, of the phase correction element; wherein in the area of numerical aperture $NA_2$, a first phase correction layer comprising a concavo-convex portion of a saw-tooth-form or an approximated saw-tooth-form having a cross-sectional shape of a saw-tooth-form or a saw-tooth-form, each of whose tooth is approximated by a step form, and having a rotational symmetry with respect to the optical axis of an incident light, is formed, and the first phase correction layer and a phase plate which transforms linearly polarized incident light having a wavelength of $\lambda_1$ into circularly polarized light by generating an odd number times of $\pi/2$ of birefringent phase difference, are integrally formed, whereby a transmitted wavefront of light having a wavelength of $\lambda_2$, or light having a wavelength of $\lambda_2$ and light having a wavelength of $\lambda_3$ incident in the region of numerical aperture $NA_2$ are changed while a transmitted wavefront of light having a wavelength of $\lambda_1$ incident in the region of numerical aperture $NA_1$ is maintained regardless of the polarization state, said phase correction element further comprises a first transparent material and a second transparent material having different refractive index wavelength dispersions from each other, wherein the difference $\Delta n$ of their refractive indexes is 0 at the wavelength $\lambda_1$ and finite values at the wavelength $\lambda_2$ and the wavelength $\lambda_3$, the first transparent material comprises a saw-tooth-form concavo-convex portion having a cross-sectional shape of a saw-tooth-form or a saw-tooth-form each of whose tooth is approximated by a step form, and having a rotational symmetry with respect to the optical axis of an incident light, at least concave portions of the concavo-convex portion are filled with the second transparent material, and the height d of each of convex portions of the saw-tooth-form satisfies a formula $\lambda_2/2 \leq \Delta n \times d \leq \lambda_3$ provided that the difference of the refractive indexes at the wavelength $\lambda_2$ is $\Delta n$.

2. A phase correction element for transmitting three kinds of light beams having wavelengths $\lambda_1$, $\lambda_2$ and $\lambda_3$ respectively ($\lambda_1 < \lambda_2 < \lambda_3$), which has an area of numerical aperture $NA_2$ and an area of numerical aperture $NA_1$ including the area of numerical aperture $NA_2$ ($NA_1 > NA_2$) in an element plane in which the light is incident, of the phase correction element; wherein in the area of numerical aperture $NA_2$, and a first phase correction layer comprising a concavo-convex portion of a saw-tooth-form or an approximated saw-tooth-form having a cross-sectional shape of a saw-tooth-form or a saw-tooth-form, each of whose tooth is approximated by a step form, and having a rotational symmetry with respect to the optical axis of an incident light, is formed, and the first phase correction layer and a phase plate which transforms linearly polarized incident light having a wavelength of $\lambda_1$ into circularly polarized light by generating an odd number times of $\pi/2$ of birefringent phase difference, are integrally formed, whereby a transmitted wavefront of light having a wavelength of $\lambda_2$, or light having a wavelength of $\lambda_2$ and light having a wavelength of $\lambda_3$ incident in the region of numerical aperture $NA_2$ are changed while a transmitted wavefront of light having a wavelength of $\lambda_1$ incident in the region of numerical aperture $NA_1$ is maintained regardless of the polarization state, wherein the first phase plate is constructed by laminating two phase plates having birefringent phase differences of $\pi$ and $\pi/2$ respectively at a middle wavelength $\lambda_c = (\lambda_1 + \lambda_2)/2$ of $\lambda_1 = 410$ nm wavelength band and $\lambda_2 = 650$ nm wavelength band, so that the angle between their optical axes is $57 \pm 5°$, and the first phase plate produces a birefringent phase difference of an odd number times of $\pi/2$ at least for linearly polarized incident light in the $\lambda_1$ and $\lambda_2$ wavelength bands to transform the linearly polarized incident light into circularly polarized light.

3. A phase correction element for transmitting three kinds of light beams having wavelengths $\lambda_1$, $\lambda_2$ and $\lambda_3$ respectively ($\lambda_1 < \lambda_2 < \lambda_3$), which has an area of numerical aperture $NA_2$ and an area of numerical aperture $NA_1$ including the area of numerical aperture $NA_2$ ($NA_1 > NA_2$) in an element plane in which the light is incident, of the phase correction element; wherein in the area of numerical aperture $NA_2$, and a first phase correction layer comprising a concavo-convex portion of a saw-tooth-form or an approximated saw-tooth-form having a cross-sectional shape of a saw-tooth-form or a saw-tooth-form, each of whose tooth is approximated by a step form, and having a rotational symmetry with respect to the optical axis of an incident light, is formed, and the first phase correction layer and a phase plate which transforms linearly polarized incident light having a wavelength of $\lambda_1$ into circularly polarized light by generating an odd number times of $\pi/2$ of birefringent phase difference, are integrally formed, whereby a transmitted wavefront of light having a wavelength of $\lambda_2$, or light having a wavelength of $\lambda_2$ and light having a wavelength of $\lambda_3$ incident in the region of numerical aperture $NA_2$ are changed while a transmitted wavefront of light having a wavelength of $\lambda_1$ incident in the region of numerical aperture $NA_1$ is maintained regardless of the polarization state, wherein each of convex portions of the saw-tooth-form of the first phase correction layer is approximated by a step form, and the phase difference of a transmitted light having a wavelength of $\lambda_1$ between a convex portion and a concave portion of each step of the step form is a natural number times of $4\pi$, and said phase correction element further comprises a second phase correction layer in an area of aperture $NA_3$ ($NA_2 > NA_3$) in the plane of the phase correction element, the second phase correction layer comprising a birefringent material layer having an ordinary refractive index $n_o$ and an extraordinary refractive index $n_e$ ($n_e \neq n_o$) in which the optical axis of a refractive index ellipsoid is uniformly in one direction, wherein the birefringent material layer comprises a saw-tooth-form concavo-convex portion having a saw-tooth-form cross-sectional shape each of whose convex portions is approximated by a step form, and having a rotational symmetry with respect to the optical axis of an incident light, at least concave portions of the concavo-convex portion are filled with a homogeneous refractive index transparent material having a refractive index of $n_s$ approximately equal to the ordinary refractive index $n_o$ or the extraordinary refractive index $n_e$, and the phase difference of extraordinarily polarized transmitted light or ordinarily polarized transmitted light having a wavelength of $\lambda_1$ corresponding to the step-height of each step of the step form, is an odd number times of $2\pi$.

4. The phase correction element according to claim 3, wherein the first phase plate has a function of generating a birefringent phase difference of an odd number times of $\pi/2$ for linearly polarized incident light having a wavelength of $\lambda_1$ to convert it to circularly polarized light, and generating a birefringent phase differences of an odd number times of $\pi$ for linearly polarized light having a wavelength of $\lambda_2$ and linearly polarized light having a wavelength of $\lambda_3$ to rotate their polarization planes.

5. The phase correction element according to claim 4, wherein the first phase plate has a construction that two phase plates having birefringent phase differences of $\pi/2$ and $\pi$ respectively for a wavelength $\lambda_1$, are laminated so that the angle between their optical axes is $45 \pm 5°$.

6. A phase correction element for transmitting three kinds of light beams having wavelengths $\lambda_1$, $\lambda_2$ and $\lambda_3$ respectively ($\lambda_1 < \lambda_2 < \lambda_3$), which has an area of numerical aperture $NA_2$ and an area of numerical aperture $NA_1$ including the area of numerical aperture $NA_2$ ($NA_1 > NA_2$) in an element plane in which the light is incident, of the phase correction element;

wherein in the area of numerical aperture $NA_2$, and a first phase correction layer comprising a concavo-convex portion of a saw-tooth-form or an approximated saw-tooth-form having a cross-sectional shape of a saw-tooth-form or a saw-tooth-form, each of whose tooth is approximated by a step form, and having a rotational symmetry with respect to the optical axis of an incident light, is formed, and the first phase correction layer and a phase plate which transforms linearly polarized incident light having a wavelength of $\lambda_1$ into circularly polarized light by generating an odd number times of $\pi/2$ of birefringent phase difference, are integrally formed, whereby a transmitted wavefront of light having a wavelength of $\lambda_2$, or light having a wavelength of $\lambda_2$ and light having a wavelength of $\lambda_3$ incident in the region of numerical aperture $NA_2$ are changed while a transmitted wavefront of light having a wavelength of $\lambda_1$ incident in the region of numerical aperture $NA_1$ is maintained regardless of the polarization state, wherein the first phase correction layer comprises a birefringent material layer having an ordinary refractive index of $n_o$ and an extraordinary refractive index $n_e (n_o \neq n_e)$, in which the optical axis of the refractive index ellipsoid is uniformly in one direction, the birefringent material layer has a saw-tooth-form concavo-convex portion having a cross-sectional shape of a saw-tooth-form or a shape in which each of convex portions of a saw-tooth-form is approximated by a step form, and having a rotational symmetry with respect to the optical axis of an incident light, and at least concave portions of the concave-concave portion are filled with a homogeneous refractive index transparent material having a refractive index of $n_s$ approximately equal to the ordinary refractive index $n_o$ or the extraordinary refractive index $n_e$, wherein the first phase plate has a function of generating a birefringent phase difference of an odd number times of $\pi/2$ for linearly polarized light in a $\lambda_1 = 410$ nm wavelength band to convert it to a circularly polarized light, and generating a birefringent phase difference of an odd number times of $\pi$ for linearly polarized light in a $\lambda_2 = 650$ nm wavelength band and linearly polarized light in a $\lambda_3 = 780$ nm wavelength band to rotate their polarization planes, a second phase plate has a function of generating a birefringent phase difference of an even number times of $\pi$ for linearly polarized incident light in a $\lambda_1 = 410$ nm wavelength band without changing the polarization state, and generating a birefringent phase difference of an odd number times of $\pi$ for linearly polarized incident light in a $\lambda_2 = 650$ nm wavelength band and linearly polarized light in a $\lambda_3 = 780$ nm wavelength band to rotate their polarization planes by 90°, and the first phase plate, the first polarizing phase correction layer, the second phase plate and the second polarizing phase correction layer are arranged in this order and integrated.

7. A phase correction element for transmitting three kinds of light beams having wavelengths $\lambda_1$, $\lambda_2$ and $\lambda_3$ respectively ($\lambda_1 < \lambda_2 < \lambda_3$), which has an area of numerical aperture $NA_2$ and an area of numerical aperture $NA_1$ including the area of numerical aperture $NA_2$ ($NA_1 > NA_2$) in an element plane in which the light is incident, of the phase correction element; wherein in the area of numerical aperture $NA_2$, a first phase correction layer comprising a concavo-convex portion of a saw-tooth-form or an approximated saw-tooth-form having a cross-sectional shape of a saw-tooth-form or a saw-tooth-form, each of whose tooth is approximated by a step form, and having a rotational symmetry with respect to the optical axis of an incident light, is formed, and the first phase correction layer and a phase plate which transforms linearly polarized incident light having a wavelength of $\lambda_1$ into circularly polarized light by generating an odd number times of $\pi/2$ of birefringent phase difference, are integrally formed, whereby a transmitted wavefront of light having a wavelength of $\lambda_2$, or light having a wavelength of $\lambda_2$ and light having a wavelength of $\lambda_3$ incident in the region of numerical aperture $NA_2$ are changed while a transmitted wavefront of light having a wavelength of $\lambda_1$ incident in the region of numerical aperture $NA_1$ is maintained regardless of the polarization state, wherein a multi-layer film filter which transmits incident light in a $\lambda_1 = 410$ nm wavelength band and incident light in a $\lambda_2 = 650$ nm wavelength band and reflects incident light in a $\lambda_3 = 780$ nm wavelength band, or a diffraction grating which transmits incident light in a $\lambda_1 = 410$ nm wavelength band and incident light in a $\lambda_2 = 650$ nm wavelength band and diffracts incident light in a $\lambda_3 = 780$ nm wavelength band and has a rectangular cross-sectional shape producing a phase difference of 10 $\pi$ for transmitted light in a $\lambda_1 = 410$ nm wavelength band between a convex portion and a concave portion, is formed in an annular region obtained by subtracting a circular region of a numerical aperture $NA_3$ from a circular region of a numerical aperture $NA_1$ ($NA_1 > NA_2 > NA_3$) in the phase correction element plane.

8. A phase correction element for transmitting three kinds of light beams having wavelengths $\lambda_1$, $\lambda_2$ and $\lambda_3$ respectively ($\lambda_1 < \lambda_2 < \lambda_3$), which comprises:

two polarizing phase correction layers each comprising a high-molecular liquid crystal layer formed on a transparent substrate and having a concavo-convex portion and a homogeneous transparent material filling concave portions of the concavo-convex portion; and two phase plates;

wherein the first phase plate has a function of generating a birefringent phase difference of an odd number times of $\pi/2$ for linearly polarized light in a $\lambda_1 = 410$ nm wavelength band to convert it to a circularly polarized light, and generating a birefringent phase difference of an odd number times of $\pi$ for linearly polarized light in a $\lambda_2 650$ nm wavelength band and linearly polarized light in a $\lambda_3 32\ 780$ nm wavelength band to rotate their polarization planes, the second phase plate has a function of generating a birefringent phase difference of an even number times of $\pi$ for linearly polarized incident light in a $\lambda_1 = 410$ nm wavelength band without changing the polarization state, and generating a birefringent phase difference of an odd number times of $\pi$ for linearly polarized incident light in a $\lambda_2 = 650$ nm wavelength band and linearly polarized light in a $\lambda_3 = 780$ nm wavelength band to rotate their polarization planes by 90°, and the first phase plate, the first polarizing phase correction layer, the second phase plate and the second polarizing phase correction layer are arranged in this order and integrated.

9. The phase correction element according to claim 1, wherein each of convex portions of the saw-tooth-form of the first phase correction layer is approximated by a step form, and the phase difference of a transmitted light having a wavelength of $\lambda_1$ between a convex portion and a concave portion of each step of the step form is a natural number times of $4\pi$.

10. The phase correction element according to claim 1, wherein the first phase plate is constructed by laminating two phase plates having birefringent phase differences of $\pi$ and $\pi/2$ respectively at a middle wavelength $\lambda_c = (\lambda_1 + \lambda_2)/2$ of $\lambda_1 = 410$ nm wavelength band and $\lambda_2 = 650$ nm wavelength band, so that the angle between their optical axes is $57 \pm 5°$, and the first phase plate produces a birefringent phase difference of an odd number times of $\pi/2$ at least for linearly polarized incident light in the $\lambda_1$ and $\lambda_2$ wavelength bands to transform the linearly polarized incident light into circularly polarized light.

11. The phase correction element according to claim 1, which further comprises a second phase correction layer in an area of aperture $NA_3$ ($NA_2 > NA_3$) in the plane of the phase correction element, the second phase correction layer comprising a birefringent material layer having an ordinary refractive index $n_o$ and an extraordinary refractive index $n_e$ ($n_e \neq n_o$) in which the optical axis of a refractive index ellipsoid is uniformly in one direction, wherein the birefringent material layer comprises a saw-tooth-form concavo-convex portion having a saw-tooth-form cross-sectional shape each of whose convex portions is approximated by a step form, and having a rotational symmetry with respect to the optical axis of an incident light, at least concave portions of the concavo-convex portion are filled with a homogeneous refractive index transparent material having a refractive index of $n_s$ approximately equal to the ordinary refractive index $n_o$ or the extraordinary refractive index $n_e$, and the phase difference of extraordinarily polarized transmitted light or ordinarily polarized transmitted light having a wavelength of $\lambda_1$ corresponding to the step-height of each step of the step form, is an odd number times of $2\pi$.

* * * * *

UNITED STATES PATENT AND TRADEMARK OFFICE
CERTIFICATE OF CORRECTION

PATENT NO. : 7,688,700 B2  Page 1 of 1
APPLICATION NO. : 11/045088
DATED : March 30, 2010
INVENTOR(S) : Ooi et al.

It is certified that error appears in the above-identified patent and that said Letters Patent is hereby corrected as shown below:

On the title page, Item (63), the Related U.S. Application Data information is incorrect. Item (63) should read:

Item -- Related U.S. Application Data
(63) Continuation of Application No. PCT/JP03/09746,
filed on Jul. 31, 2003. --

Signed and Sealed this

Twenty-fifth Day of May, 2010

David J. Kappos
*Director of the United States Patent and Trademark Office*